United States Patent
Grosse et al.

(10) Patent No.: US 10,248,688 B2
(45) Date of Patent: Apr. 2, 2019

(54) ANNOTATIONS FOR PARALLELIZATION OF USER-DEFINED FUNCTIONS WITH FLEXIBLE PARTITIONING

(71) Applicants: Philipp Grosse, Frankfurt (DE); Wolfgang Lehner, Dresden (DE); Norman May, Karlsruhe (DE)

(72) Inventors: Philipp Grosse, Frankfurt (DE); Wolfgang Lehner, Dresden (DE); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 208 days.

(21) Appl. No.: 14/316,444

(22) Filed: Jun. 26, 2014

(65) Prior Publication Data

US 2015/0379076 A1    Dec. 31, 2015

(51) Int. Cl.
*G06F 17/30* (2006.01)

(52) U.S. Cl.
CPC .. *G06F 17/30421* (2013.01); *G06F 17/30463* (2013.01)

(58) Field of Classification Search
CPC .................................................. G06F 17/30445
See application file for complete search history.

(56) References Cited

U.S. PATENT DOCUMENTS

| | | | |
|---|---|---|---|
| 6,353,818 B1 * | 3/2002 | Carino, Jr. | G06F 17/30463 |
| 6,954,776 B1 * | 10/2005 | Cruanes | G06F 9/5066 709/201 |
| 9,454,571 B2 | 9/2016 | Grosse et al. | |
| 2003/0037048 A1 * | 2/2003 | Kabra | G06F 17/30445 |
| 2004/0193439 A1 * | 9/2004 | Marrott | G06Q 40/12 705/30 |
| 2005/0177553 A1 * | 8/2005 | Berger | G06F 17/30333 |
| 2006/0271917 A1 * | 11/2006 | Das | G06F 8/31 717/130 |
| 2010/0241827 A1 * | 9/2010 | Yu | H04L 12/44 712/30 |
| 2011/0276789 A1 * | 11/2011 | Chambers | G06F 9/445 712/220 |
| 2013/0138626 A1 * | 5/2013 | Delafranier | G06F 17/30421 707/713 |
| 2013/0238548 A1 * | 9/2013 | George | G06F 17/30442 707/600 |

(Continued)

OTHER PUBLICATIONS

"The role of data structures and algorithms in an in-memory database (SAP HANA Database)," IBM Global Business Services White Paper, Apr. 2014, 12 pages.

(Continued)

*Primary Examiner* — Ashish Thomas
*Assistant Examiner* — Dustin D Eyers
(74) *Attorney, Agent, or Firm* — Klarquist Sparkman, LLP

(57) ABSTRACT

Annotations can be placed in source code to indicate properties for user-defined functions. A wide variety of properties can be implemented to provide information that can be leveraged when constructing a query execution plan for the user-defined function and associated core database relational operations. A flexible range of permitted partition arrangements can be specified via the annotations. Other supported properties include expected sorting and grouping arrangements, ensured post-conditions, and behavior of the user-defined function.

19 Claims, 20 Drawing Sheets

(56) References Cited

U.S. PATENT DOCUMENTS

| | | | | |
|---|---|---|---|---|
| 2013/0332446 | A1* | 12/2013 | Zhou | G06F 17/30584 707/713 |
| 2014/0075161 | A1* | 3/2014 | Zhang | G06F 8/453 712/220 |
| 2014/0317085 | A1* | 10/2014 | Wehrmeister | G06F 17/30463 707/714 |
| 2015/0379077 | A1 | 12/2015 | Grosse et al. | |

OTHER PUBLICATIONS

Guo et al., "Spotting Code Optimizations in Data-Parallel Pipelines through PeriSCOPE," Oct. 8, 2012, 13 pages.
"MapReduce," Wikipedia, visited Apr. 28, 2014, 8 pages.
Apache mahout, http://mahout.apache.org/, Apr. 29, 2014, 2 pages.
SAP HANA, http://help.sap.com/hana, Apr. 29, 2014, 1 page.
Agarwal et al., "Re-optimizing data-parallel computing." In Proc. of USENIX NSDI, pp. 21-35, 2012.
Alexandrov et al., "Massively parallel data analysis with PACTs on Nephele," PVLDB 3(2): 1625-1628, 2010.
Binning et al., "SQLScript: Efficiently Analyzing Big Enterprise Data in SAP HANA," in BTW, pp. 363-382, 2013.
Bu et al., "Efficient iterative data processing on large clusters," PVLDB 3(1): 285-296, 2010.
Chaiken et al., "SCOPE: Easy and Efficient Parallel Processing of Massive Data Sets," Proc VLDB Endow., 1(2): 1265-1276, Aug. 2008.
Chu et al., "Map-Reduce for Machine learning on multicore," in NIPS, pp. 281-288, 2006.
Dean et al. "MapReduce: Simplified Data processing on large clusters," in OSDI, pp. 137-150, 2004.
Friedman et al., "SQL/MaReduce: A practical approach to self-describing, polymorphic and parallelizable user-defined functions," Proc VLDB Endow., 2(2): 1402-1413, Aug. 2009.
Gillick et al., MapReduce: Distributed computing for machine learning, 2006.
Grosse et al., "Advance analytics with the SAP HANA database," in DATA, pp. 61-71, 2013.
Grosse et al., "Bridging two worlds with RICE Integrating R into the SAP in-memory computing engine." PVLDB 4(12): 1307-1317, 2011.
Hellerstein, et al., "Predicate Migration: Optimizing Queries with Expensive Predicates," in Proceedings of the 1993 ACM SIGMOD international conference on management of data, SIGMOD '93, pp. 267-276, New York NY 1993.
Hoperoft et al., "Algorithm 447: efficient algorithms for graph manipulation," commun. ACM 16(6): 372-378, Jun. 1973.
ISO/IEC 9075-2:2003 Information Technology—database languages—AQL—Part 2: foundation (SQL/foundation), International organization for standardization, Geneva, Switzerland 2003, 1268 pages.
Jaedicke et al., "on parallel processing of aggregate and scalar functions in object-relational DBMS," in proceedings of the 1998 ACM SIGMOD international conference on management of data, SIGMOD '98, pp. 378-389, 1998.
Jaedicke et al., "user-defined table operators: enhancing extensibility for ORDBMS," in proceedings of the $25^{th}$ international conference on very large data bases, VLDB '99, pp. 494-505, 1999.
Neumann et al., "on the optimal ordering of maps and selections under factorization," in proceedings of the $21^{st}$ international conference on data engineering, ICDE '05, pp. 490-501, 2005.
Pavlo, et al., "A comparison of approaches to large-scale data analysis," in proceedings of the 2009 ACM SIGMOD international conference on management of data, SIGMOD '09, pp. 165-178, 2009.
Rheilaender, et al., "SOFA: An extensible logical optimizer for UDF-heavy dataflows," arXIV preprint arXIV:1311.6335, 2013.
Su et al. "Oracle in-database Hadoop: when MapReduce meets RDBMS., " in proceedings of the 2012 ACM SIGMOD international conference on management of data, SIGMOD '12, pp. 779-790, New York, NY, 2012.
Thusoo et al., "Hive: A warehousing solution over a map-reduce framework," Proc. VLDB Endow 2(2), Aug. 2009.
Zhou et al., "Incorporating partitioning and parallel plans into the SCOPE optimizer," 2013 IEEE $29^{th}$ International Conference on Data Engineering (ICDE) 0:1060-1071, 2010.
"Partition (database)," Wikipedia, visited May 15, 2014, 3 pages.
De Supinski, "Progress on OpenMP Specifications," Lawrence Livermore National Laboratory, Nov. 13, 2012, 19 pages.
"Quick View," SAP Help Portal (help.sap.com), visited Jun. 4, 2014, 3 pages.
DeFlorio et al., "An Application-Level Dependable Technique for Farmer-Worker Parallel Programs," Proc. Int. Conf. and Exhib. on High-Performance Computing and Networking (HPCN Europe 1997) Lecture Notes in Computer Science 1225, pp. 644-653, 1997, 10 pages.
Grosse et al, "A Study of Partitioning and Parallel UDF Execution with the SAP HANA Database," Abstract, ACM Digital Library, Jun. 24, 2014, 1 page.
Grosse et al., "A Study of Partitioning and Parallel UDF Execution with the SAP HANA Database," *26th International Conference on Scientific and Statistical Database Management*, Aalborg, Denmark, Jun. 30, 2014, 14 pages.
European Search Report from related counterpart European Patent Application No. 15001836.4, dated Oct. 30, 2015, 7 pages.
Chaudhuri, "An Overview of Query Optimization in Relational Systems," Proceedings of the 1998 ACM SIGMOD International Conference on Management of Data; [Proceedings of the ACM SIGACT-SIGMOD-SIGART Symposium on Principles of Database systems], Seattle, Washington, 1998, pp. 34-43, 10 pages.
"WINDOW clause," SQL Anywhere 12.0.0 documentation, dcx.sap.com, 2010, 3 pages.

* cited by examiner

```
CREATE TYPE D1(testID Integer, makeID Integer, status CHAR(10));

CREATE PROCEDURE sample(IN data D1, OUT sample D1)
READS SQL DATA LANGUAGE PSEUDOC AS
BEGIN PARALLEL
PARTITION(data(MINPART(NONE), MAXPART(ANY)))
EXPECTED(data(GROUPING(NONE), SORTING(NONE)))
BEGIN
    outRow = 1;
    forall inRow in 1:size(data):
        if(data[inRow].status == "OK" and math::random() > 0.1):
            continue;
        sample[outRow].testID = data[inRow].testID;
        sample[outRow].makeID = data[inRow].makeID;
        sample[outRow].status = data[inRow].status;
        outRow++;
END
ENSURE KEY(sample = data), PRESERVE ORDER(sample = data),
SIZE(sample = 0.05 * data + 0.1 * 0.95 * data),
RUNTIMEAPPROX(1 * data), DETERM(0)
END PARALLEL UNION ALL;
```

Script 1: SQLScript pseudo code of the sample UDF with partition ANY

FIG. 14

Algorithm 1: OptimizeExpr(*expr, reqd*)
Input: Expression *expr*, ReqdProperties *reqd*
Output: Set of QueryPlans *plans*
/*Enumerate all the possible logical rewrites */
LogicalTransform(*expr*);
foreach logical expression *lexpr* do
   /*Try out implementations for its root operator */
   PhysicalTransform(*lexpr*);
   foreach expression *pexpr* that has physical implementation for its root operator do
      ReqdProperties reqdChild =
         DetermineChildReqdProperties(*pexpr, reqd*);
      /*Optimize child expressions */
      foreach *Child* of *pexpr* do
         QueryPlans *childPlans* =
            OptimizeExpr(*pexpr.Child, reqdChild*);
         foreach *planChild* in *childPlans* do
            DlvdProperties *dlvd* =
               DeriveDlvdProperties(*planChild*);
            if PropertyMatch(*dlvd, reqd*) then
               EnqueueToValidPlans();
            end
         end
      end
   end
end
*plans* = CheapestQueryPlans();

return *plans*;

(a) Single host (b) Four node cluster

FIG. 17

```
Create Type D1(fileID1 Integer, fileID2 Integer,
               hashList CLOB, groupID Integer);
Create Type D2(changes Boolean);

Create Procedure break(IN control D2, OUT reloop Boolean)
LANGUAGE PSEUDOC AS BEGIN
    Boolean reloop = FALSE;
    forall row in 1:size(control):
       reloop = reloop or control[row].changes;
       if reloop:  break;
END;

Create Procedure UDF1(IN edgeSet D1, OUT edgeSet2 D1)
BEGIN PARALLEL PARTITION(edgeSet(minPart(NONE),maxPart(fileID1)))
EXPECTED(edgeSet(GROUPING(fileID1)))
BEGIN ... END
ENSURE KEY(=), DETERM(1), PRESERVE ORDER, SIZE(=)
RUNTIMEAPPROX(1 * edgeSet)
END PARALLEL UNIONALL(edgeSet2);

Create Procedure UDF2(IN edgeSet2 D1, OUT edgeSet D1, OUT changes D2)
BEGIN PARALLEL PARTITION(edgeSet(minPart(NONE),maxPart(fileID2)))
EXPECTED(edgeSet(GROUPING(fileID2)))
BEGIN ... END
ENSURE KEY(edgeSet = edgeSet2),
DETERM(1), PRESERVE ORDER, SIZE(edgeSet = edgeSet2)
RUNTIMEAPPROX(1 * edgeSet2)
END PARALLEL UNIONALL(edgeSet, changes);

Create Procedure connectedComp(IN edgeSet D1, OUT out D1)
LANGUAGE SQLSCRIPT AS
BEGIN
    do{
       call UDF1(:edgeSet, edgeSet2);
       call UDF2(:edgeSet2, edgeSet, changes);
    } while( call break(:changes));
    out = :edgeSet;
END;
```

Script 2: Code for edge set only loop logic

FIG. 18

```
Create Type D1(fileID1 Integer, fileID2 Integer,
            hashList CLOB, groupID Integer);
Create Type D2(changes Boolean);
Create Type D3(fileID Integer, groupID Integer);

Create Procedure UDF3(IN edgeSet D1, IN nodeSet D3, OUT nodeSet2 D3)
BEGIN PARALLEL PARTITION(edgeSet(minPart(NONE), maxPart(fileID1)),
                         nodeSet(minPart(NONE), maxPart(NONE)))
EXPECTED(edgeSet(GROUPING(fileID1)))
BEGIN ... END
ENSURE KEY(nodeSet2 = edgeSet), PRESERVE ORDER(nodeSet2 = edgeSet),
DETERM(1), SIZE(nodeSet2 = nodeSet)
RUNTIMEAPPROX(edgeSet + nodeSet)
END PARALLEL UNIONALL(nodeSet2);

Create Procedure UDF4(IN edgeSet D1, IN nodeSet2 D3, OUT changes D2,
                      OUT nodeSet D3, OUT edgeSet2 D1)
BEGIN PARALLEL PARTITION(edgeSet(minPart(NONE), maxPart(fileID2)),
                         nodeSet2(minPart(NONE), maxPart(NONE)))
EXPECTED(edgeSet(GROUPING(fileID2)))
BEGIN ... END
ENSURE KEY(nodeSet = edgeSet, edgeSet2 = edgeSet), DETERM(1),
SIZE(nodeSet = nodeSet2, edgeSet2 = edgeSet),
RUNTIMEAPPROX(edgeSet + nodeSet2),
PRESERVE ORDER(nodeSet = edgeSet, edgeSet2 = edgeSet)
END PARALLEL UNIONALL(nodeSet, edgeSet2, changes);

Create Procedure connectedComp2(IN edgeSet D1, OUT out D1)
LANGUAGE SQLSCRIPT AS
BEGIN
    nodeSet = SELECT Id_File AS fileID, Id_File AS groupID
           FROM Change_File GROUP BY Id_File;
    do{
      call UDF3(:edgeSet, :nodeSet, nodeSet2);
      call UDF4(:edgeSet, :nodeSet2, nodeSet, edgeSet2, changes);
    } while( call break(:changes));
    out = :edgeSet2;
END;
```

Script 3: Code for the loop logic with additional node set

ANNOTATIONS FOR PARALLELIZATION OF USER-DEFINED FUNCTIONS WITH FLEXIBLE PARTITIONING

BACKGROUND

Today's computing environment is often characterized by large data sets. Although impressive technologies have evolved to efficiently handle such large data sets, software developers continue to push the envelope to new limits. For example, systems already have techniques for handling built-in database operations on large data sets, but often falter when presented with custom functionality.

Thus, there is a need for technologies to better address processing large data sets with custom functionality.

SUMMARY

The summary is provided to introduce a selection of concepts in a simplified form that are further described below in the detailed description. The summary is not intended to identify key features or essential features of the claimed subject matter, nor is it intended to be used to limit the scope of the claimed subject matter.

An embodiment can be implemented as a method comprising, for source code defining an executable program comprising both one or more relational operations and one or more user-defined functions, receiving one or more source code annotations for a user-defined function appearing in the source code, wherein a source code annotation out of the source code annotations specifies a property for parallelized instances of the user-defined function; receiving a relational operation out of the relational operations; and based on the relational operation, the source code annotation, and the user-defined function, generating a query execution plan optimized for parallel execution according to the property.

An embodiment can be implemented as one or more computer-readable media having encoded thereon structured data causing a compiler to generate a query execution plan comprising instances of a relational database operation and a user-defined function, the structured data comprising source code comprising the relational database operation; and source code comprising the user-defined function, wherein the user-defined function comprises an annotation specifying a range of permitted partition arrangements for parallelized executing instances of the user-defined function; wherein the range of permitted partition arrangements for the parallelized executing instances of the user-defined function constrains the query execution plan.

An embodiment can be implemented as one or more computer-readable media having encoded therein computer-executable instructions causing a computing system to perform a method comprising receiving source code comprising a relational operation, a user-defined function coupled to the relational operation, and an annotation for the user-defined function indicating a range of permitted partition arrangements for inputs to parallelized instances of the user-defined function via an explicit upper boundary of permitted partition arrangements and an explicit lower boundary of permitted partition arrangements; and generating an optimized, parallelized query execution plan for the source code based on the annotation; wherein the range of permitted partition arrangements is specified in the annotation in terms of a column of an input database table to the user-defined function; and wherein the generating comprises considering a plurality of partition possibilities within the range of permitted partition arrangements inclusively between the explicit upper boundary and the explicit lower boundary and choosing a preferred partition possibility out of the plurality of partition possibilities and an optimal degree of parallelism.

BRIEF DESCRIPTION OF THE DRAWINGS

FIG. 13 is pseudo code for a script that has been annotated according to the technologies described herein.

FIG. 14 is pseudo code for an algorithm that optimizes a program representation.

FIG. 17 is pseudo code for a script that has been annotated according to the technologies described herein.

FIG. 18 is pseudo code for another script that has been annotated according to the technologies described herein.

DETAILED DESCRIPTION

Example 1—Overview

The technologies described herein can be used for a variety of query execution plan optimization scenarios, and adoption of the technologies can provide improved techniques for parallel processing of large data sets with a mixture of user-defined functions and known relational operation.

To the degree that an execution environment treats a user-defined function as a black box, it can be difficult to optimize execution of the user-defined function because the details of the required pre-conditions, ensured post-conditions, and behavior of the user-defined function are not known. Annotations can be particularly helpful in this regard because the software developer can annotate the user-defined function to indicate required, ensured, or behavioral properties. Such properties can then be used during optimization of a software program incorporating the user-defined function, leading to improved parallel execution performance.

By whatever way such properties of user-defined functions are determined or acquired, they can be incorporated into a stored representation of the software program. The stored representation can then be processed for optimization, resulting in a query execution plan optimized for parallel execution.

A wide variety of properties can be supported, leading to intelligent decisions by the optimizer during the optimization process. In some cases, a flexible range of properties can be specified. Optimization can consider multiple arrangements within such a range, leading to superior performance.

Rather than simply applying full merge and initial partition for a user-defined function, an optimizer can break such an isolated view and take surrounding operations and their structural properties into account. For example, partial partitioning and partial merging can be supported.

Thus, the minimal and maximal partitioning supported by a user-defined function can be specified, allowing flexibility during optimization, which can result in higher performance during parallel execution of the user-defined function.

Other annotations can be supported, such as expected grouping and ordering, ensure key, preserving order, approximation of size, approximation of run time, and the like.

Alternatives to full merge and initial partitioning can also be supported during optimization. For example, tuples can be reshuffled, existing partitioning (e.g., from a relational operation) can be used (e.g., by a user-defined function). Existing partitioning can also be reused when entering a loop and across loop iterations.

As described herein, the technologies can be employed by software developers to improve the performance of programs that incorporate user-defined functions. End users also benefit because the programs exhibit improved performance.

Various other features can be implemented and combined as described herein.

Figure 1:
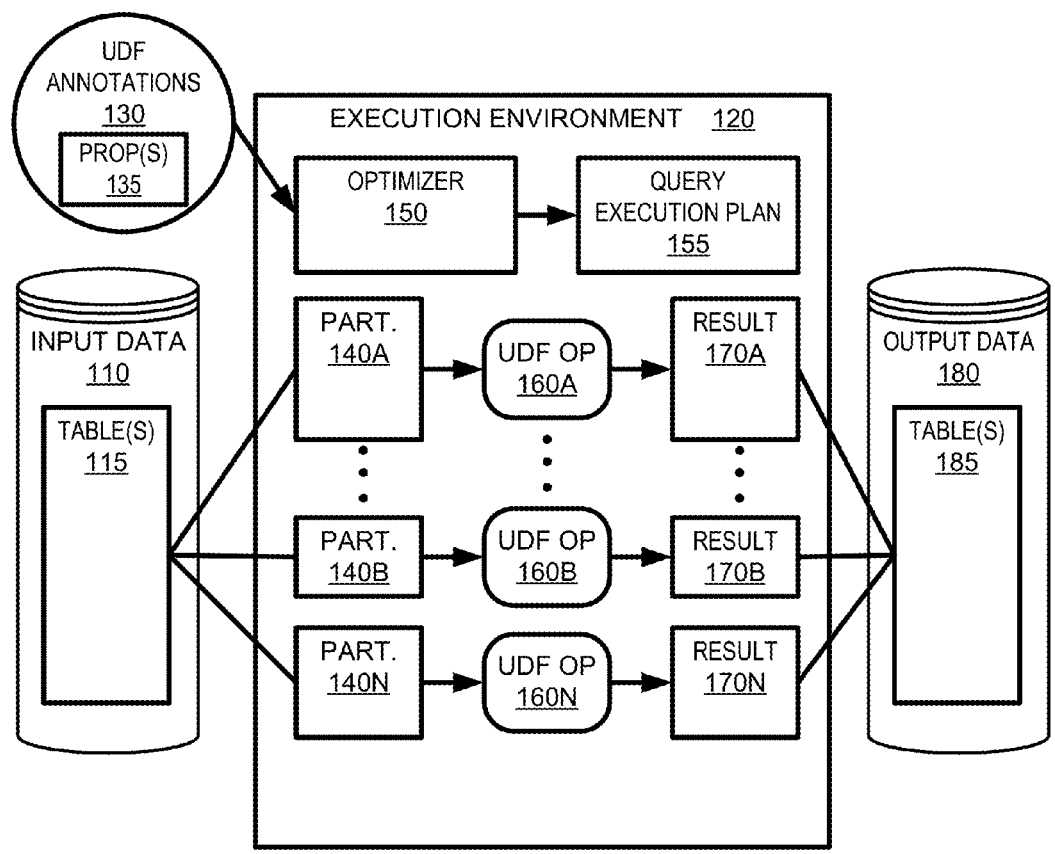
FIG. 1 is a block diagram of an example system implementing optimized parallel execution of a program including one or more user-defined operations and one or more core database relational operations.

Example 2—Example System Implementing Optimized Parallel Execution Technologies FIG. 1 is an illustrative overview of an example system 100 implementing optimized parallel execution of a program including one or more user-defined operations and one or more core database relational operations. In FIG. 1, an execution environment 120 can accommodate execution of a program that comprises both one or more user-defined functions and one or more core database relational operations. As described herein, flexible partitioning arrangements can be considered during optimization.

The technologies can process one or more annotations 130 that are associated with source code defining a user-defined function that indicate one or more properties 135 of the user-defined function that can be processed to optimize parallelized execution as described herein. For example, an optimizer 150 can take the annotations 130 as input and generate a query execution plan 155 that is optimized for parallelized execution. The optimizer 150 can take advantage of properties of the user-defined function that are indicated by the annotations 130. Although shown as part of the execution environment 120, the optimizer 150 can be implemented outside of, or partially outside of the environment 120.

During execution, the input data 110 comprising one or more input tables 115 is divided into different partitions 140A-N and handed to parallelized instances 160A-N of a user-defined function, which produce results 170A-N that are then eventually merged into one or more output tables 185 that are part of the output data 180.

For ease of illustration, the partition operations, merge operations, and core database relational operations are not explicitly shown. In practice, there can be numerous such operations and numerous output-input couplings between user-defined functions and core database relational operations that involve partition and/or merge operations. The partition and merge arrangements can be implemented in a wide variety of ways and take any number of forms, and processing can be substantially different than those shown merely for illustrative purposes. For example, initial partitioning can be avoided, deferred, or partially leveraged as described herein. Similarly, merging output can also be avoided, deferred, or partially leveraged as described herein. Such processing can be based on properties of the user-defined functions (e.g., as indicated in the annotations 130).

Although input tables 115 and output tables 185 are shown as separate in the illustration, in practice, tables can be modified in place, partially modified in place, cached, stored in memory, or the like. For example, in-memory columnar database processing can be supported for superior performance.

In practice, the systems shown herein, such as system 100 can vary in complexity, with different functionality, components of differing complexity, and the like. For example, in practice, the execution environment 120 can comprise a variety of other functionality not shown to address locality of information, synchronization, security, and the like. In practice, a large number of tables, some with large numbers of records can be supported.

Although various components of the systems herein are shown as a single component, in practice, the boundaries between components can be changed. For example, in practice, the execution environment 120 can be implemented across one or more machines, virtual or physical. Functionality can be distributed among such machines (e.g., to clients, server, or the like) as desired. Additional features relating to security, load balancing, and redundancy can also be included.

The system 100, any of the other systems described herein, and subsets of such systems can be implemented in conjunction with any of the hardware components described herein, such as the computing systems described below (e.g., processing units, memory, and the like). In any of the examples herein, the inputs, outputs, source code, annotations, databases, program representations, query execution plans, and the like can be stored in one or more computer-readable storage media or computer-readable storage devices. The technologies described herein can be generic to the specifics of operating systems or hardware and can be applied in any variety of environments to take advantage of the described features.

Figure 2:
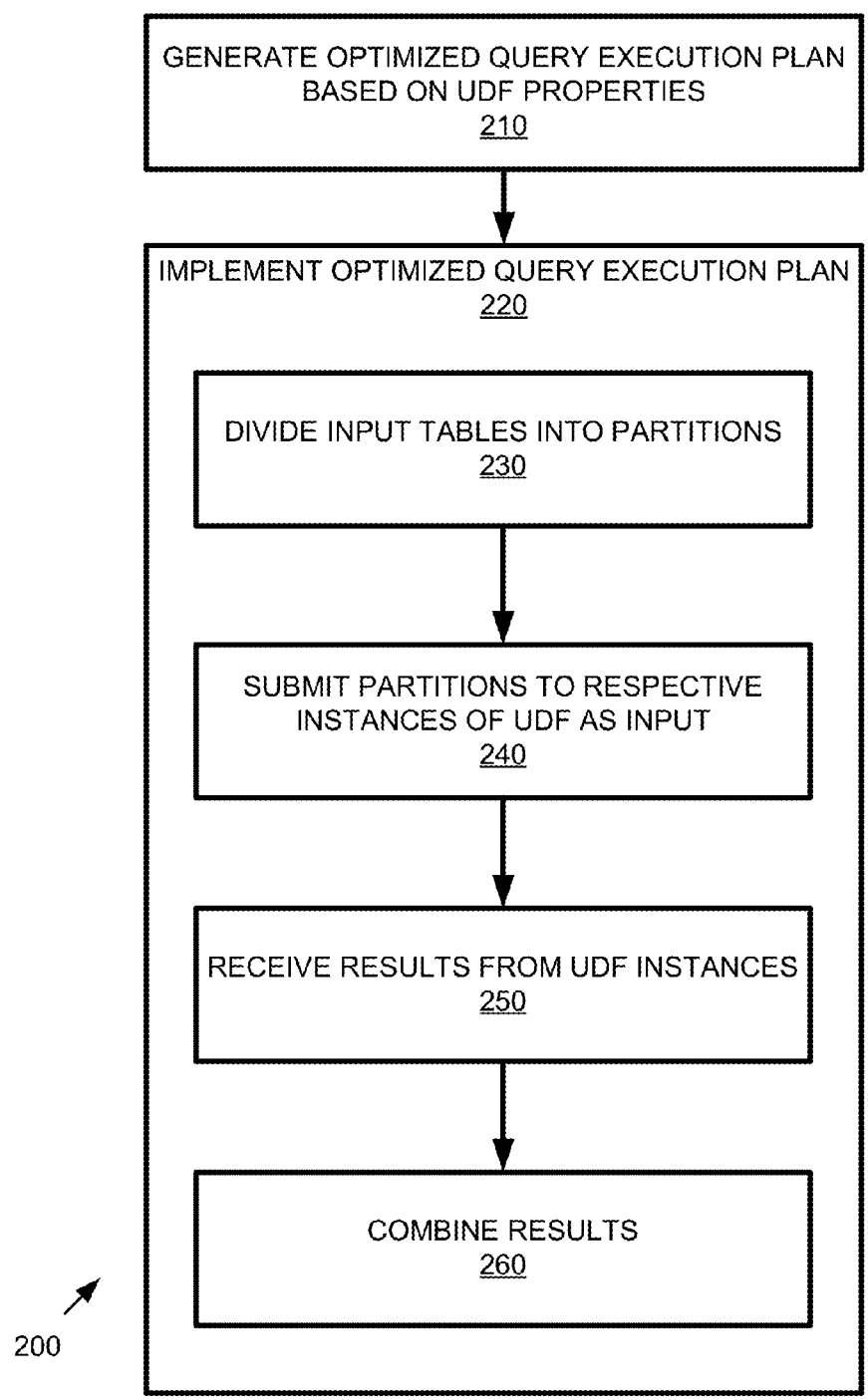
FIG. 2 is a flowchart of an example method of implementing optimized parallel execution of a program including one or more user-defined operations and one or more core database relational operations.

Example 3—Example Method Implementing Optimized Parallel Execution Technologies FIG. 2 is a flowchart of an example method 200 of implementing optimized parallel execution of a program including one or more user-defined operations and one or more core database relational operations and can be implemented, for example, in the system shown in FIG. 1. As described herein, flexible partitioning arrangements can be considered during generation of an optimized query execution plan and leveraged during execution. As with the other methods described herein, the order of the acts can be changed while still implementing the described technologies.

At 210, a query execution plan optimized for parallel execution of the program is generated based on properties of a user-defined function according to the techniques described herein. As shown herein, such properties can be derived from annotations associated with source code defining user-defined functions of the program.

At 220, the optimized query execution plan is implemented to achieve execution of the software program. At 230, during execution, input tables for the user-defined function are divided into partitions. Such a process is sometimes called "initial partitioning." At 240, the partitions are submitted to respective parallelized instances of the user-defined function as input. The user-defined function then performs processing on its respective partition.

At 250, the results from the parallelized instances of the user-defined functions are received.

At 260, the results are combined (e.g., via a merge operation).

The partitioning and merging operations can be performed according to the optimized query execution plan, which depends on the properties of the user-defined function, which themselves can be derived from source code annotations of the user-defined function.

Although a partition (e.g., before execution) and full merge (e.g., after execution) can be done in some cases for a set of parallelized instances of a user-defined function, the technologies described herein can take surrounding operations and their structural properties into account to avoid, leverage, or defer such processing. For example, initial partitioning may be omitted in some cases if the output of a previous user-defined function or core database relational operation result is already suitably partitioned.

Similarly, besides partition arrangements, other conditions of the data (e.g., sorting, grouping, ordering or the like) can similarly be indicated by properties to avoid, leverage, or defer processing such as sorting, grouping, ordering or the like.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Core Database Relational Operations

In any of the examples herein, core database relational operations (or "operators") can take the form of any of a variety of relational operations performed on databases in a relational context. For example, JOIN, UNION, PROJECT, AGGREGATE, and the like and variations thereon (e.g., OUTER JOIN, UNION ALL, and the like) can be supported in an execution environment. In practice, optimization of such built-in functions can be incorporated into a compiler or interpreter based on intimate knowledge of how such functions work, characteristics of the system, characteristics of the data, and the like. An optimizer can thus parallelize such operations based on such knowledge.

For example, although properties of such operations are not shown explicitly in source code, such properties are known to the system and can be considered by an optimizer as described herein in conjunction with properties of user-defined functions that are determined via other techniques (e.g., via source code annotations as described herein).

In practice, such relational operations can be represented in source code using keywords, symbols, or the like that indicate the actual relational operation that is performed during execution.

Example 5—Example User-Defined Functions

In any of the examples herein, the technologies can support any of a wide variety of user-defined functions to extend built-in functionality of a data management system. In practice, such functions can take the form of whatever processing is desired by a software developer that falls outside of core database relational operations. Because the system does not have knowledge about the internal workings of such functions, it essentially treats a user-defined function as a black box. However, via the annotations and/or properties described herein, pertinent knowledge about the preconditions, post-condition, and behavior of such user-defined functions can be communicated to the optimizer, which can take such information into account when optimizing for parallel execution.

Thus, the "user" in user-defined function can be a user in a role outside of the core database developers.

Any of a wide variety of functionality can be incorporated into user-defined functions. For example, even non-deterministic functions (e.g., incorporating statistical sampling), non-standard statistical processing, or the like can be accommodated.

Example 6—Example Optimization

In any of the examples herein, although the terms "optimization," "optimizer," "optimal," or "superior" are used, the arrived at execution or query execution plan need not strictly take the form of the single most superior arrangement. Optimization can set a goal of improving performance in certain scenarios (e.g., parallel execution) given a set of constraints, properties, available hardware, and the like.

In practice, a plurality of alternatives are considered, and the optimizer chooses a preferred alternative (e.g., improved performance) in light of (e.g., based on) information available to the optimizer (e.g., properties, optimization factors, and the like).

Although improved performance is often measured in execution time, other metrics relating to computing resources can be improved, such as memory utilized, machines used, or the like.

Example 7—Example Software Program

In any of the examples herein, the software program being optimized can take a wide variety of forms. Such a program is sometimes called a "workflow," "dataflow," or the like. In practice, such programs are typically written by developers as source code, and such source code can include the annotations described herein. However, the technologies can be applied to situations in which properties for user-defined functions are known or determined, whether or not they appear in source code annotations.

In some examples, the program comprises at least one core database relational operation and at least one user-defined function. As shown herein, actual implementations can have any number of operations that are combined in a variety of ways. Any implementation in the context of a data management system can benefit.

Although examples are shown in particular programming languages, the technologies can operate independently of the source code language.

Example 8—Example Parallel Execution

In any of the examples herein, the software program can be executed using parallel execution techniques. For example, plural cores in a single machine, plural machines, or the like can be used. Machines can be physical or virtual (e.g., that ultimately execute on physical hardware). The techniques described herein can be applied across a variety of parallel execution arrangements. Testing has shown that if parallelization can make execution time much faster if execution is parallelized.

Example 9—Example Optimization Factors

In any of the examples herein, parallel execution can be optimized based on a variety of factors in addition to processing time and memory consumption. For example, factors such as number of cores, number of nodes (e.g., machines), processing cost, and processing size can be included. Specifics such as table size can also be considered. As described herein, annotations can provide the optimizer with size and run time knowledge (e.g., relative to input size).

An optimizer can implement a cost-based decision making process to choose a degree of parallelism.

Example 10—Example Properties

In any of the examples herein, one or more properties can be associated with a user-defined function. For example, a stored representation of a program comprising the user-defined function can include such properties and be used during optimization for parallel execution. Annotations described herein can be used in source code of the user-defined function to indicate such properties.

A wide variety of properties can be supported. Properties can be broadly divided into categories such as pre-condition properties, post-condition properties, and behavior properties (e.g., compiler or optimizer hints).

Pre-conditions can include a pre-condition for input to the user-defined function (e.g., parallelized instances of the user-defined function). For example, a pre-condition property can indicate a partition property expected by the user-defined function. As described herein, the technologies support specifying a flexible range of properties for a user-defined function (e.g., via an annotation); the range is then included in a stored representation of the associated software program and respected in the resulting optimized query execution plan.

Partition properties can include global structural properties that are expected to hold true across parallelized instances of the user-defined function (e.g., globally across the instances).

Other pre-conditions for input to the user-defined function (e.g., parallelized instances of the user-defined functions) can include local structural properties that define how data within each partition is to be organized. Examples include grouping and sorting properties. For example, a property can indicate that the data submitted to a particular (e.g., "local") instance is expected to be sorted.

Post-conditions can include a post-condition for output of a user-defined function (e.g., parallelized instances of the user defined function). For example, a post-condition property can indicate a grouping property, sorting property, or other condition that is guaranteed or ensured to be true by the user-defined function for its output (e.g., local sorting is guaranteed by the user-defined function).

Post-conditions can also indicate whether a condition of the data is modified by the user-defined function (e.g., a parallelized instance). For example, a preserve property for ordering can specify that the user-defined function guarantees that the data remains in the same order (e.g., if the data is sorted at input, it will continue to be sorted at output).

Post-conditions can also specify an expected merge function for combining results of parallelized instances. For example, it can be specified whether order should be preserved, duplicates should be removed, or the like. A custom (e.g., user-defined) merge function can be specified if desired standard alternatives such as UNION ALL are not desired.

Behavior properties can include whether the user-defined function is deterministic, an expected size of the output, an expected run time for the user-defined function, and the like.

Similar properties can also be associated with core database relational operations as described herein for use when optimizing a query execution plan. In contrast to properties of user-defined functions, properties for sorting and partitioning core database relational operations are typically known by and built in to the optimization system (e.g., annotations are not needed).

Example 11—Example Source Code Annotations

In any of the examples herein, source code annotations can be used to specify properties of user-defined functions. Such an approach can be helpful during optimization because the software developer's knowledge of the user-defined function can be passed to the optimizer for consideration during the optimization process.

A wide variety of annotations indicating a wide variety of properties of user-defined functions can be supported. Like properties, annotations can be divided into categories such as pre-conditions (e.g., for input), post-conditions (e.g., for output), and behavior. An annotation can thus be used to specify any of the properties described herein.

For example, a source code annotation can specify a pre-condition (e.g., for input tables) for parallelized instances of a user-defined input. The format of the annotation can include an indication of the table involved (e.g., an input table, output table, or the like).

As described herein, an annotation (e.g., pre-condition) can specify a range of acceptable partition arrangements (e.g., for input tables) via an explicit upper bound and an explicit lower bound. Examples herein refer to such bounds as max or MAXPART and min or MINPART, where MAXPART explicitly specifies a maximum permitted partition arrangement, and MINPART explicitly specifies a minimum permitted partition arrangement. Keywords such as NONE, ANY, or a set of one or more column names can be used to specify maximum and minimum permissible partition arrangements.

The annotation can specify a range in terms of one or more table columns (e.g., by column name) as described herein. The table column can be interpreted as specifying GROUP BY partitioning. Such a pre-condition specifies a global structural property that is expected to hold true across parallelized instances of the user-defined function.

As described herein, the annotations can be used to construct a representation of the software program incorporating the user-defined function, which is used to generate an optimized query plan that respects the pre-conditions and can leverage the post-conditions and behaviors specified.

Source code annotations can also specify an expected grouping or sorting condition for an input table of the user-defined function (e.g., parallelized instances thereof), resulting in association with the corresponding property.

Source code annotations can also specify a permitted merge arrangement for combining results of the parallelized instances of the user-defined function, resulting in association with the corresponding property.

As described for the properties, a source code annotation can specify a grouping or sorting condition for an output table of the user-defined function (e.g., a parallelized instance thereof).

Behavior annotations can include an expected size of an output (e.g., in terms of an input size). For example, a factor can be specified. Similarly, an annotation can specify an expected run time of a parallelized instance of the user-defined function in terms of an input size (e.g., via a factor). Factors can be scalar, multiplicative, exponential, or the like.

The specific form and syntax of annotations can be modified as desired. In one implementation, the annotations are used at the border of a procedure defining the user-defined function, but a variety of programming languages and formats can be supported.

Example 12—Example Query Execution Plan Optimization System

Figure 3:
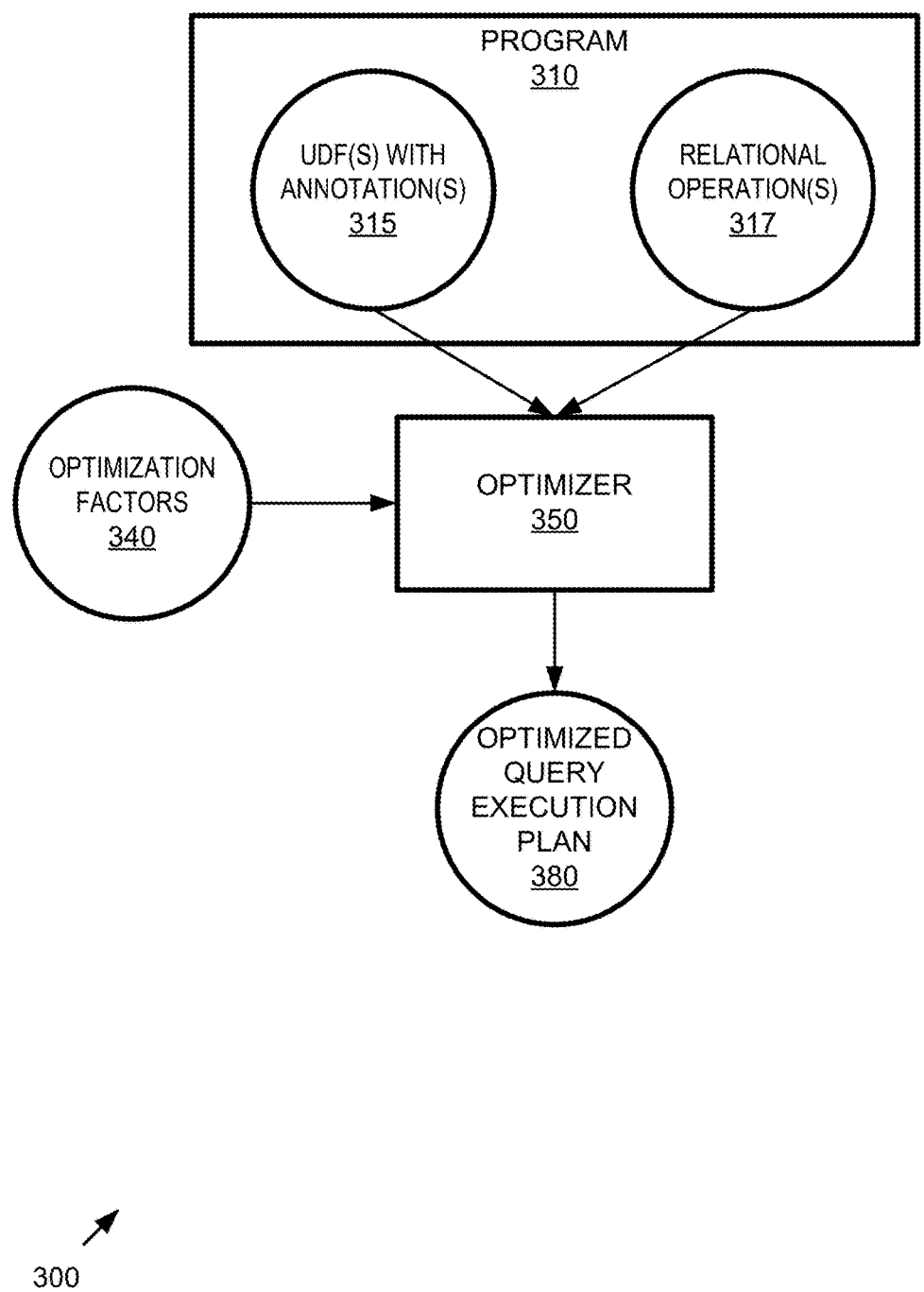
FIG. 3 is a block diagram of an example query execution plan optimization system integrating a variety of information to generate an optimized query execution plan.

FIG. 3 is a block diagram of an example query execution plan optimization system integrating a variety of information to generate an optimized query execution plan. In the example, the optimizer 350 accepts a program 310 comprising one or more user-defined functions 315 with annotations and one or more core database relational operations 317 and optimization factors 340 as input.

Based on the inputs, the optimizer 350 can generate an optimized query execution plan 380 that is optimized for parallel execution. The optimizer can be configured to take into account properties associated with user-defined functions to optimize parallel execution of the program 310 via the optimized query execution plan 380.

As described herein, the optimizer 350 can be configured to already have detailed knowledge of the relational operations 317 that is sufficient to optimize parallel execution of the operations 317 in a variety of scenarios involving tables of large size. The annotations for the user-defined functions 315 can also inform the optimizer how to generate the plan 380, even though the exact functionality of the user-defined functions 315 remains unknown by the optimizer 350. For example, properties of the user-defined functions can be determined via the annotations, and a wide variety of annotations and properties can be supported, including a flexible range of partition arrangements as described herein.

As described herein, the optimizer 350 can store an internal representation of the program 310 that includes a representation of the couplings and properties of the operations. The plan 380 can then be generated based on the internal representation.

In any of the examples herein, the plan 380 can then be executed in an execution environment to accomplish processing of the program 310.

Example 13—Example Query Execution Plan Optimization System

Figure 4:
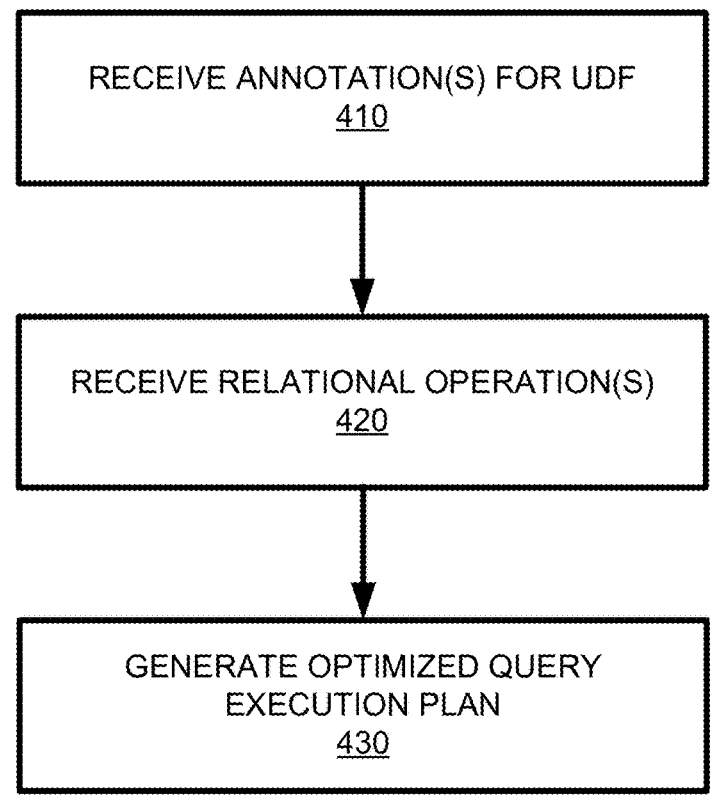
FIG. 4 is a flowchart of an example method generating an optimized query execution plan.

FIG. 4 is a flowchart of an example method 400 generating an optimized query execution plan and can be implemented, for example, in a system such as that shown in FIG. 3.

At 410, one or more annotations for a user-defined function are received. For example, for source code defining an executable program comprising both one or more relational operations and one or more user-defined functions, one or more source code annotations for a user-defined function appearing in the source code can be received. At least one of the source code annotations can specify a property for a parallelized instance of the user-defined function (e.g., a global structural property or a local structure property). Further properties as described herein can be included.

At 420, at least one of the one or more relational operations (e.g., indications of such operations) of the executable program is received. After receipt, a representation of the relational operation can be stored for consideration by an optimizer. The relational operation can have an output-input coupling with the user-defined function as described herein.

At 430, based on the relational operation, the source code annotation, and the user-defined function, a query execution plan optimized for parallel execution according to the property can be generated as described herein. In practice, a plurality of properties, including known properties of the relational operation, can be considered. As described herein, such a plan can be generated via a stored representation of an input program. If desired, a canonical query execution plan can be generated and then optimized (e.g., based on the properties indicated by the annotations).

Although the example shows a scenario involving at least one user-defined function and at least one relational operation, the optimization technologies herein can be applied to various other combinations of user-defined functions and relational operations (e.g., scenarios comprising a relational operation to user-defined function coupling, a user-defined function to relational operation coupling, a user-defined function to user-defined function coupling, or the like).

The query execution plan can then be implemented. Implementation can include executing the parallelized instances of the user-defined function, other operations, or both. In some cases, the optimizer may find that parallelization is not appropriate.

Example 14—Example Range of Permitted Partition Arrangements

Figure 5:
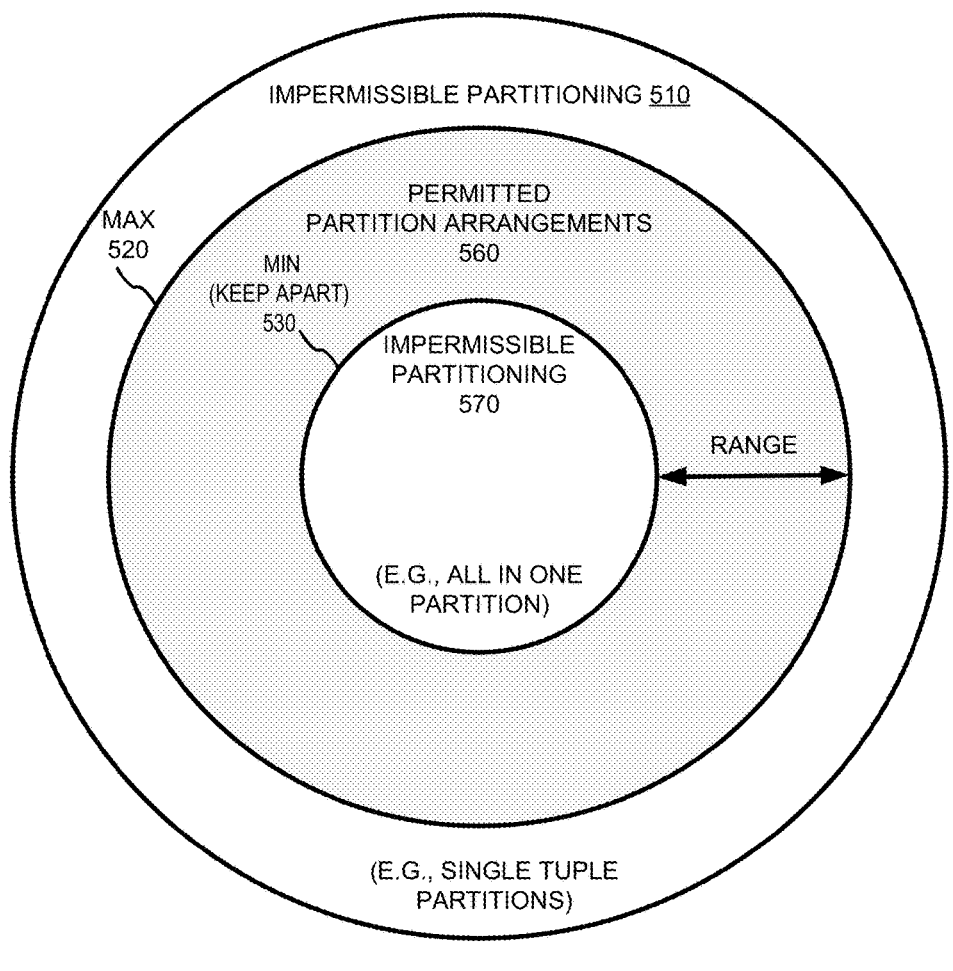
FIG. 5 is a Venn diagram of an example indication of a range of permitted partition arrangements.

FIG. 5 is a Venn diagram of an example indication of a range of permitted partition arrangements. As shown by the diagram, there is a set of possible 500 partitioning arrangements, some of which are permitted 560 and some of which are impermissible 510, 570. A "permitted" arrangement is one that is expected (e.g., required) by a function, such as the user-defined functions described herein. If the input to the function is not within the permitted range, correct operation of the function is not guaranteed (e.g., the input data may break the logic of the user-defined function).

The technologies herein can accommodate a range of permitted partition arrangements 560 defined by an upper bound 520, sometimes called "max" and a lower bound 530, sometimes called "min." Such bounds can be specified explicitly and define a flexible range of permitted partition arrangements. In annotations, explicit specification can be by keyword, one or more column names, or both (e.g., "maxPart(fileID1)" to specify an upper bound in terms of a column). A table name can also be included to indicate for which table the partition range is being specified.

Under one perspective, the upper bound 520 can be considered as defining to what degree records having the same values (e.g., for a column or permutations for a plurality of columns) must be kept together in a same partition. Thus, an impermissible partitioning arrangement 510 is one that does not keep the records sufficiently together (e.g., they are all in separate partitions). However, as long as like values (e.g., for a column) are kept together in like partitions, further keeping together is permitted (e.g., the records can all be in one partition).

Conversely, the lower bound 530 can be considered as defining to what degree records having the same values must be kept apart. Thus, an impermissible partitioning arrangement 570 is one that does not keep the records sufficiently apart (e.g., they are all in the same partition). However, as long as different values (e.g., for a column) are kept apart in different partitions, further separation (e.g., into single tuples) is permitted.

As described herein, if the partitioning arrangement presented to an input of a function is not within the permitted range 560 (e.g., there is a property mismatch), the partitioning arrangement can be remedied. As described herein, having a range of permitted arrangements allows the choice of a remedy that exhibits superior performance. For example, some alternatives may be cheaper, while others are more costly to generate. By way of a general example, if partitioning is course, the partitions can possibly be sub-partitioned. Similarly, partial merges of partitions can result in a desired maximum partitioning. Any number of other remedies can be applied as described herein.

Further details and example formal definitions are included below. The diagram is presented for illustration purposes. Some partition arrangement ranges may not be divided as shown. For example, partition arrangements for plural database columns can be supported as described herein.

Such a range can be specified by annotations in source code for a user-defined function and subsequently represented in a stored representation of a program incorporating the user-defined function.

The ability to specify a range allows an optimizer flexibility when generating a query execution plan. For example, partition or merge operations can be chosen or avoided based on what partition arrangements are permitted as described herein. Such a flexible range gives the optimizer some degree of freedom when deciding how to partition data.

Example 15—Example Relationships Between Annotations and Execution

Figure 6:
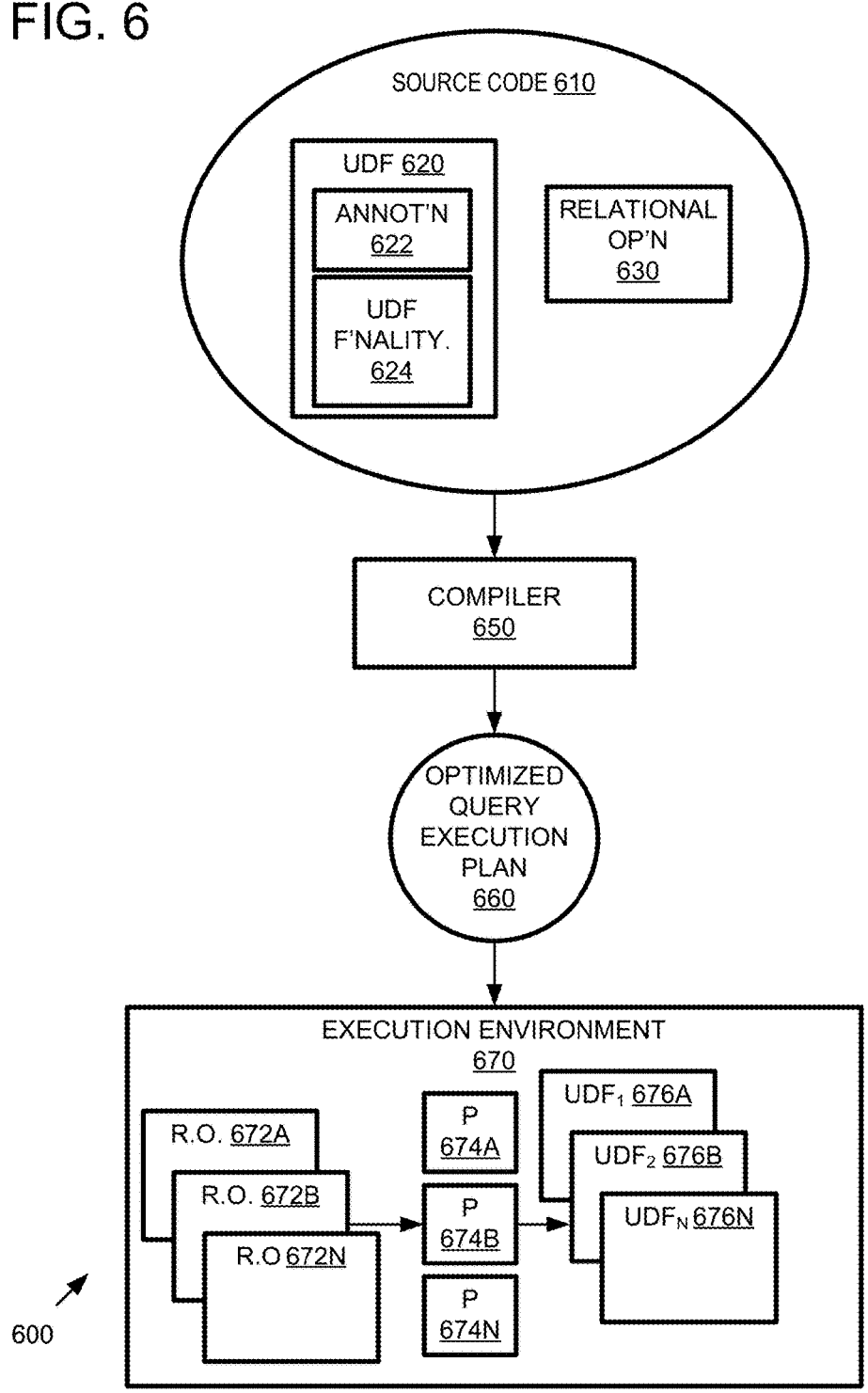
FIG. 6 is a block diagram of an example relationship between source code annotations and ultimate executing instances of a user-defined function resulting from the annotations.

FIG. 6 is a block diagram of an example system 600 exhibiting a relationship between source code annotations and ultimate executing instances of a user-defined function resulting from the annotations. In the example, source code 610 comprises a core database relational operation 630 and the user-defined function 620 with an annotation 622 and the actual functionality 624. As shown during execution, the core database relational operation 630 can be in an output-input relationship with the user-defined function 620.

The source code serves as structured data causing a compiler 650 (e.g., comprising an optimizer) to generate a query execution plan 660 comprising instances 672A-N of the relational database option 630 and instances 676A-N of the user defined function 620.

As described herein, the annotation 622 can specify a range of permitted partition arrangements for parallelized executing instances 676A-N of the user-defined function 620. Such permitted arrangements constrain the query execution plan 660 so that the resulting execution in the environment 670 respected the range (e.g., the partitions 674A-N generated by the relational operation 672A-N are within the specified range).

As described herein, such an annotation can specify a range via a minimum permitted partition arrangement and a maximum permitted partition arrangement. The arrangements can be specified in terms of one or more database columns (e.g., for which a given permutation of values for the columns must be present in the same partition when executing the parallelized instances 676A-N of the user-defined function 620).

Example 16—Example Optimization Constraint by Annotations

Figure 7:
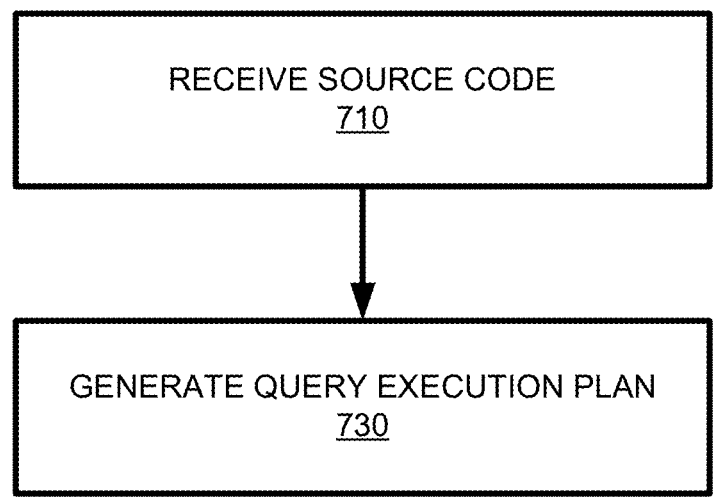
FIG. 7 is a flowchart of an example method of constraining a query execution plan based on annotations.

FIG. 7 is a flowchart of an example method of constraining a query execution plan based on annotations.

At 710, source code comprising a core database relational operation and a user-defined function coupled to the relational operation are received. An annotation for the user-defined function indicates a range of permitted partition arrangement for inputs to parallelized instances of the user-defined function via an explicit upper boundary of permitted partition arrangements and an explicit lower boundary of permitted partition arrangements.

At 730, an optimized, parallelized query execution plan is generated for the source code based on (e.g., constrained by) the annotation as described herein. Such generation can comprise considering a plurality of partition possibilities within the range of permitted partition arrangements inclusively between the explicit upper boundary and the explicit lower boundary and choosing a preferred partition out of the plurality of partition possibilities and an optimal degree of parallelism. For some operations, no parallelism may be specified.

As described herein, the range of permitted partition arrangements can be specified in the annotation in terms of a column of an input database table to the user-defined function.

Example 17—Example Query Plan Execution Plan Optimization System

Figure 8:
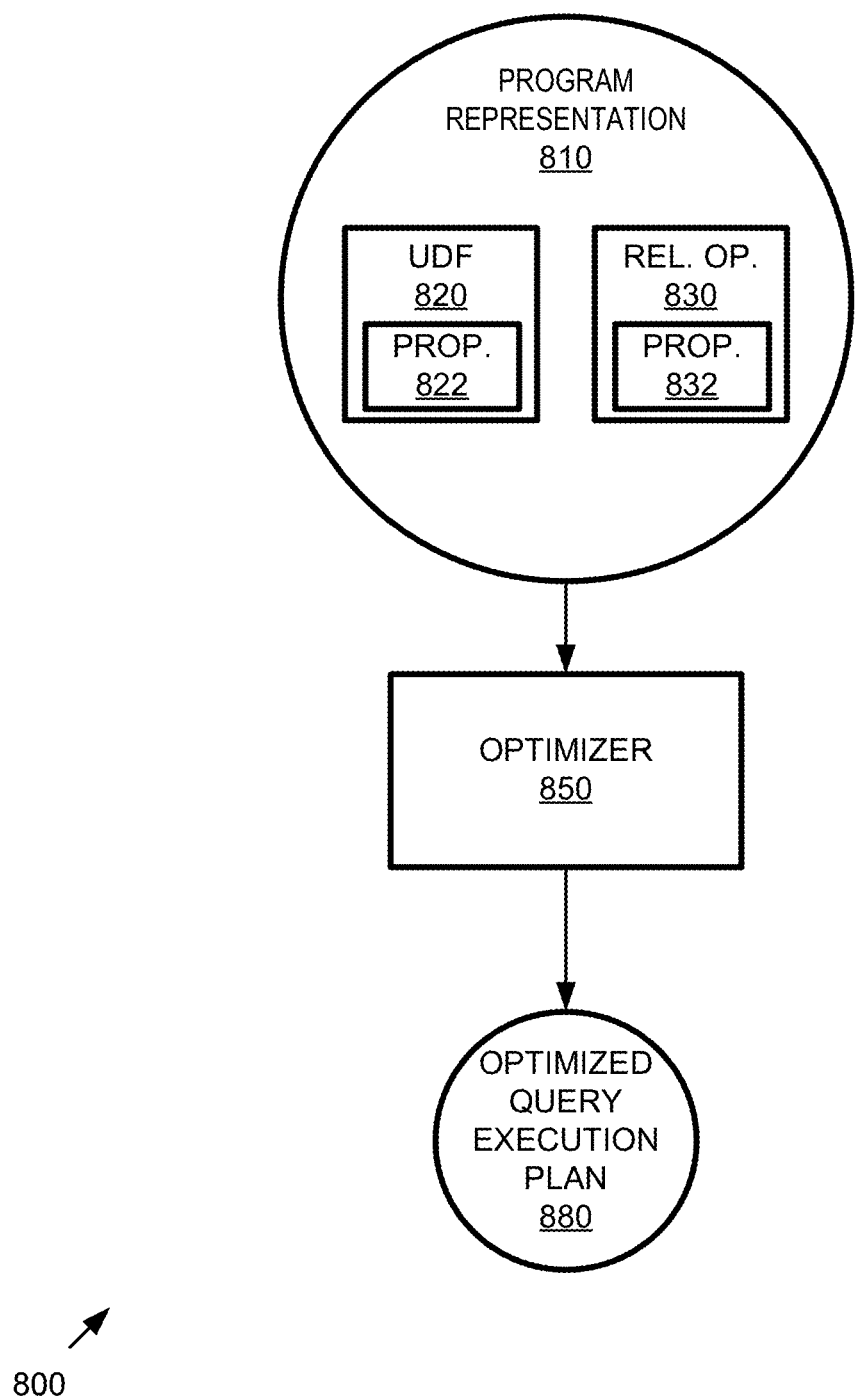
FIG. 8 is a block diagram of an example query execution plan optimization system taking a representation of a program as input.

FIG. 8 is a block diagram of an example query execution plan optimization system 800 taking a representation 810 of a program as input. The system 800 and any of the systems herein can be implemented in hardware (e.g., one or more processors coupled to memory).

In the example, a stored representation 810 of a software program comprises both one or more user-defined functions 820 and one or more core database relational operations 830. The representation operation 810 can indicate at least one property 822 for a user-defined function 820 and at least one property 832 for a core database relational operation 830. The user-defined function property 822 can be determined from annotations described herein. The relational operation property 832 can be determined on known properties of relational operations. As described herein, a property can be specified in terms of a flexible range.

The optimizer 850 can be configured to transform the representation 810 into an optimized query execution plan 880 optimized for parallel execution according to the properties 822, 832. The plan 880 can represent loop and/or nested operations as described herein.

As described herein, a canonical query execution plan can be used as the program representation 810, which is then transformed via rewrites into the optimized plan 880. Parallelism can be introduced or optimized accordingly. Techniques, including heuristics, rules, substitutions, or other optimization techniques can be applied to arrive at the plan 880. When executed, the plan 880 can instantiate multiple instances of the user-defined function, the relational operation, or both to achieve high performance processing of the represented program.

For example, if the representation 810 represents a full merge and initial partitioning operation, the optimizer 850 can rewrite the full merge and initial partitioning operation into one or more rewritten operations as described herein. Such an operation can appear between a first operation with an output having an output property and a second operation with an input having an input property and coupled to the output of the first operation (e.g., the input property specifying a range of permitted partition arrangements). The rewritten operations can be selected based on the output property and the input property. Alternative re-writes can also be chosen based on the optimization factors described herein.

The optimizer 850 can support optimization over a range of pre-condition properties, post-condition properties, and behavioral properties as described herein.

As described herein, a user-defined function property 822 can include a permitted range of partition arrangements as an input pre-condition when the user-defined function 820 is executed in parallel. The property 822 is thus a global structural property. The optimizer 850 can consider a plurality of partition arrangements in the range. The optimizer 850 can be configured to leverage partitioning already performed when within the permitted range of partition arrangements.

Other pre-conditions described herein can be in the representation 810. For example, an expected sorting condition for input to parallelized instances of the user-defined functions can appear, and the optimizer 850 can enforce such sorting conditions when generating the plan 880.

The property 832 can include a global structural property comprising a post-condition partition arrangement of an output of the core database relational operation 830. Post-conditions for user-defined functions described herein can also be represented. For example, an ensured sorting condition can be indicated by the property 822, and the optimizer 850 can leverage the condition when generating the plan 880.

The optimizer can introduce exchange operations at detected property mismatches at input-output couplings in the query execution plan as described herein.

The representation 810 can specify a merge technique for parallelized instances of the user-defined function, and the optimizer 850 can apply the specified merge technique when generating the optimized query execution plan 880 for parallel execution. As described herein, the "END PARALLEL" annotation can be used to achieve such an arrangement. The merge technique can comprise user-defined operations that are applied by the optimizer 850 when generating the plan 880.

Still further properties, such as an expected size of an output relation (e.g., in terms of an input relation) can be represented. The optimizer 850 can consider the expected size when generating the plan 880. Similarly, run time can also be represented.

Example 18—Example Query Plan Execution Plan Optimization Method

Figure 9:
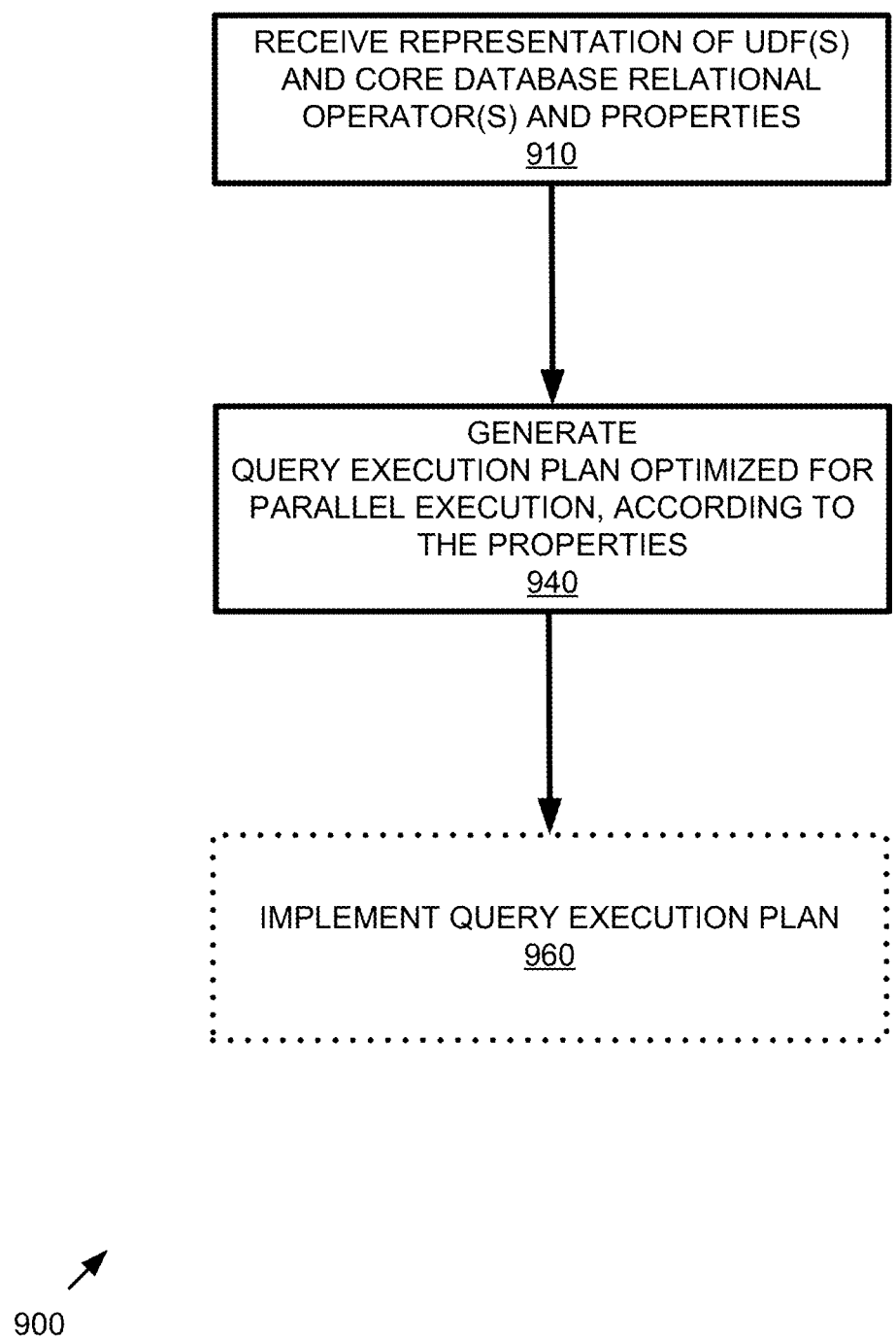
FIG. 9 is a flowchart of an example method of generating an optimized query execution plan based on represented properties of a user-defined function and a core database relational operation.

FIG. 9 is a flowchart of an example method of generating an optimized query execution plan based on represented properties of a user-defined function and a core database relational operation and can be implemented, for example, in a system such as that shown in FIG. 8.

At 910, a representation of one or more user-defined functions and one or more core database relational operations (e.g., that are part of a software program) can be received. The representation can comprise at least one property for one of the user-defined functions and at least one property for one of the core database relational operations as described herein.

As described herein, the representation can be generated based on annotations or other information indicating properties of the operations and functions.

At 940, a query execution plan optimized for parallel execution of the user-defined functions and the relational operations can be generated according to the properties. As described herein, an optimizer can select from a plurality of possible execution arrangements based on the properties, optimization factors, and the like. The degree of parallelization can also be controlled as part of optimization. As described herein, a cost-based approach can be used to arrive at an execution arrangement exhibiting superior performance. Generation can comprise rewriting a canonical query execution plan as described herein.

In practice, optimization can comprise traversing the representation 910 one or more times, applying recursion, and the like. Traversing can comprise comparing properties of a child plan (e.g., output) with permitted properties of a current operation (e.g., input). In the case of a mismatch, an exchange operation or rewritten exchange operation can be introduced. Alternatives can be considered, and one can be selected based on estimated costs and an explicitly specified range of permitted partition arrangements (e.g., specified in a representation of the program). A full merge and initial partitioning operation to remedy a mismatch can be avoided. An example implementation of optimization is shown at FIG. 14 herein.

Subsequently, at 960, the query execution plan can be implemented (e.g., executed) to achieve the processing of the user-defined functions and the core database relational operators.

Example 19—Example Exchange Operations

In any of the examples herein, an exchange operation can be introduced to remedy a mismatch in properties detected in a representation of the software program during optimization. A basic exchange operation for global structural properties (e.g., partition arrangements) comprises a full merge followed by an initial partitioning operation. However, alternative exchange operations can be derived as described herein. Such alternatives include partitioning only, merging only, keeping current partitioning (e.g., which may result in no operation), partial partitioning, or partial merging as described herein. The applicability of such alternatives can depend on the particular situation involved as described herein.

Such alternatives are sometimes called "rewrites" because they can be applied to a canonical query execution plan by substituting the alternative for a full merge and initial partitioning operation. However, the technologies can be implemented by skipping the intermediate act of representing the full merge/initial partition.

The alternatives can improve performance of the resulting parallelized execution by leveraging, avoiding, or deferring processing, such as partitioning, merging, or the like.

Example 20—Example Program Representation for Optimization

In any of the examples herein, a representation of a program, user-defined functions, and core database relational operations can be stored internally for manipulation by an optimizer to arrive at an optimized query execution plan. For example, nodes can represent operations, whether they be user-defined functions or relational operations. Edges can represent data flow between the operations. Output-input couplings can be represented as described herein to assist in determining whether there is a mismatch between properties.

In the case of annotations, the annotations can be translated into the internal stored representation (e.g., comprising properties for respective annotations) that is then processed to generate the optimized query execution plan.

Example 21—Example Output-Input Coupling

Figure 10:
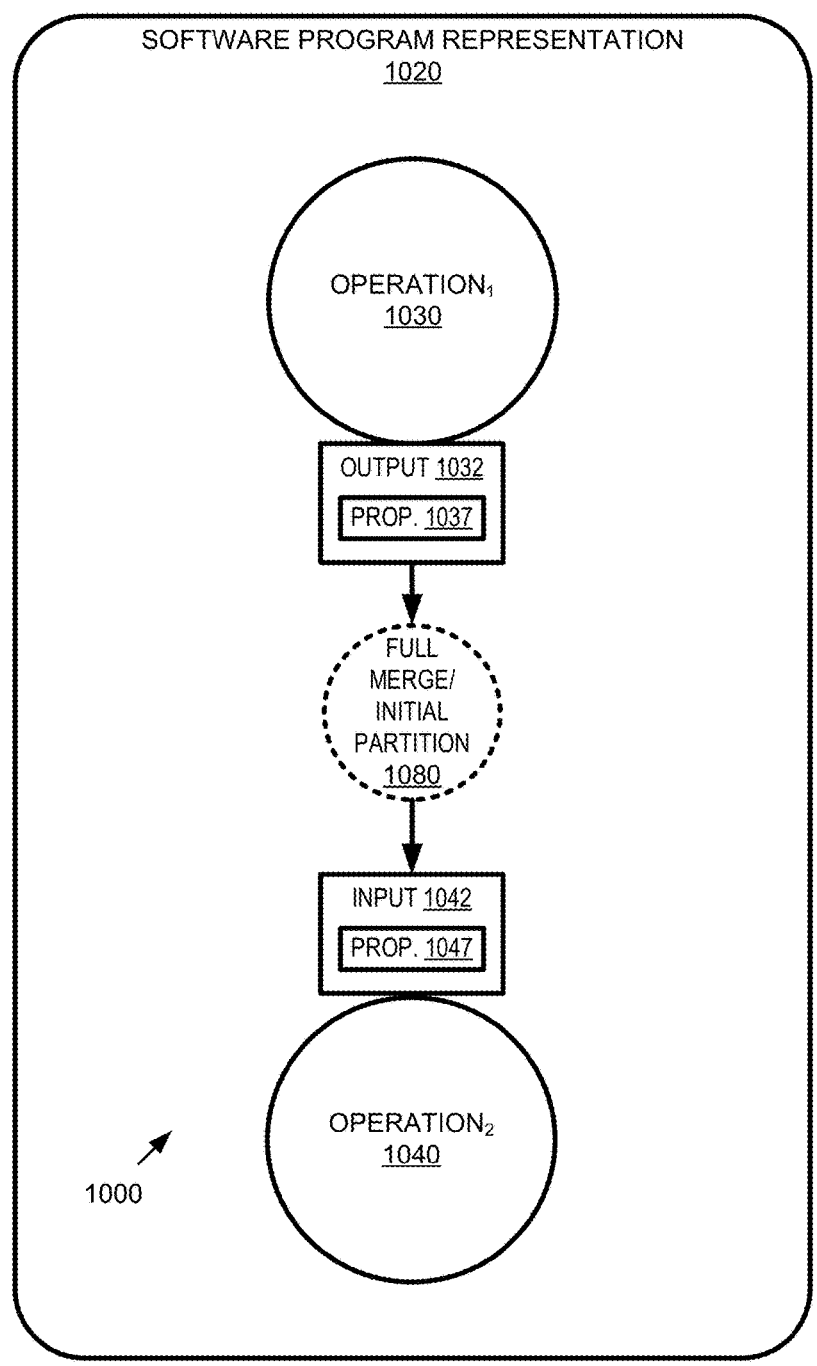
FIG. 10 is a block diagram of an exemplary output-input coupling for a representation of two operations in a program under optimization.

FIG. 10 is a block diagram of an exemplary output-input coupling 1000 for a representation of two operations in a program under optimization that can be applied to any of the examples herein. Such a coupling 1000 can represent parts of a software program where information is passed between two operations 1030, 1040. The operations can be user-defined functions or core database relational operations. Thus, scenarios comprising a relational operation to user-defined function coupling, a user-defined function to relational operation coupling, a user-defined function to user-defined function coupling, or the like can be supported. As described herein, loops and nested couplings can also be supported.

Optimization can take advantage of the known properties of the output to satisfy required properties of the input. For example, in any of the examples herein, for a coupling between output of an operation in the software program and an input of another operation (e.g., a user-defined function or core relational database operation), partitioning already performed on the output can be leveraged, deferred, or avoided.

In the example, the output 1032 of the first operation 1030 is associated with one or more stored properties 1037 in the software program representation 1020, and the input 1042 of the second operation 1040 is associated with one or more stored properties 1047 in the software program representation 1020. For user-defined functions, the properties 1037, 1047 can be based on annotations or other information as described herein.

As described herein, a mismatch between the properties 1037 and 1047 indicates that the data for the output 1032 must be altered before passing to the input 1042. Properties can be specified as a flexible range. For example, if a flexible range of partitioning arrangements are permitted, a mismatch can be avoided by choosing an overlapping permitted arrangement. However, in some cases a mismatch cannot be avoided, or optimization otherwise indicates that additional processing is to be performed before passing data to the second operation 1040.

In the case of partitioning arrangements, an exchange operation (e.g., a full merge followed by an initial partition 1080) can be performed to cure mismatches. However, as described herein, other operations such as partial partitioning, partial merge, or the like can be performed instead. In such a case, the resulting query execution plan can avoid the full merge/initial partition sequence and save processing, resulting in improved performance when optimized for parallel execution.

Other properties, such as sorting, ordering, and the like can similarly be used when determining how to handle output-input coupling between operations.

The optimizer can choose between or among options based on the properties.

Because the properties can differ for different operations, partitioning can be performed differently for a single user-defined function appearing in two different places (e.g., if the user-defined operation is coupled to operations with different output properties).

Figure 11:
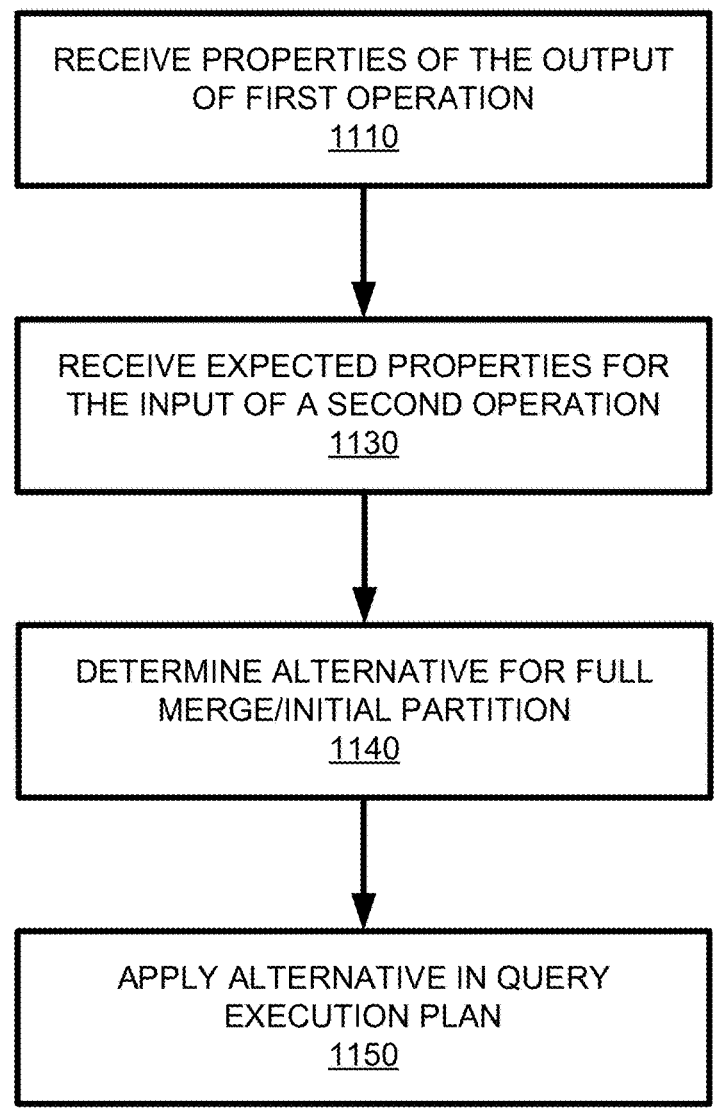
FIG. 11 is a flowchart of an example method of generating a query execution plan comprising an alternative to a full merge and initial partition.

Example 22—Example Query Execution Plan Method with Full Merge/Initial Partition Alternative FIG. 11 is a flowchart of an example method of generating a query execution plan comprising an alternative to a full merge and initial partition and can be implemented, for example, via an arrangement such as that shown in FIG. 10.

At 1110 properties of the output of a first operation are received. Such properties can indicate the structural properties (e.g., guaranteed by the first operation) described herein of output of the first operation.

At 1130, the properties for input of a second operation are received. Such properties can indicate the structure properties (e.g., expected by the second operation) described herein of input of the second operation.

Assuming there is a mismatch between the properties, at 1140, based on the properties, an alternative to a full merge and initial partition is determined for the output-input coupling of the two operations. Examples of alternatives include doing nothing (e.g., to leverage work already done), performing partitioning only, performing merging only, performing a partial merge, performing a partial re-partition, or the like. The alternative can be chosen based on the properties, cost factors, and the like.

At 1150, the alternative is applied in an optimized query execution plan implementing execution of the operations. As described herein, applying the alternative can take the form of re-writing a query execution plan or constructing a query execution plan from a representation of the software program incorporating the operations.

Example 23—Example Large Datasets

In any of the examples herein, tables with large data sets can be accommodated. For example, tables having hundreds of thousands, millions, tens or millions, hundreds of millions, or more rows can be accommodated, whether in base tables, relational results between tables, internal tables, or the like.

Example 24—Example Alternatives

The technologies are not limited to any specific database architecture or storage layout. Any system supporting user-defined functions can implement the technologies described herein.

Example 25—Example Implementations

Large-scale data analysis relies on custom code both for preparing the data for analysis as well as for the core analysis algorithms. The map-reduce framework offers a simple model to parallelize custom code, but it does not integrate well with relational databases. Likewise, the literature on optimizing queries in relational databases has largely ignored user-defined functions ("UDFs"). Herein are discussed annotations for user-defined functions that facilitate optimizations that both consider relational operators and UDFs. Such an approach can be superior to just linking map-reduce evaluation to a relational database because it enables a broader range of optimizations. Herein are described optimizations that enable the parallel execution of relational operators and UDFs for a number of typical patterns. A study on real-world data investigates the opportunities for parallelization of complex data flows containing both relational operators and UDFs.

Example 26—Introduction to Example Implementations

Much valuable information is stored in relational databases today. However, analyzing these large data sets is often limited by the expressiveness of SQL. For example, data collected for radio astronomy may require data preprocessing including data cleansing and iterative algorithms for deriving good parameters or for analyzing the data. Business applications may analyze customer data for segmentation and classification of customers to derive targeted product offers. In one example application, software predicts the relevant test cases given a code change which also requires the preprocessing steps of the test data, non-trivial data analysis and iterative computation of connected components. In such aforementioned cases there is much data with a rigid schema, and relational databases are a good candidate to store such data.

However, it may be desired to implement core parts of the analysis with user-defined functions (UDFs), e.g. the data preparation or iterative algorithms. As optimizers of databases today have limited capabilities to optimize complex queries using UDFs, they are often only used as storage containers, but not considered for the execution of such complex analytical tasks.

In recent years, the map-reduce (MR) framework has become popular for large-scale data analysis because it offers a simple model to implement custom code. The MR framework also promises good scalability because the MR runtime handles the parallel execution of independent tasks. However, MR does not integrate well with relational databases where a significant amount of relevant data is stored. Database vendors attempt to remedy this situation by implementing adapters to MR, but this limits the ability for optimizations across relational and custom logic.

Large-scale data analysis can incorporate the following. First, it is desirable to use a declarative language. The expected benefits of declarative languages are better productivity and more opportunities to optimize the resulting code. Second, the (family of) languages used to implement large-scale analysis tasks can be expressive. For example, iteration and state maintenance are typically required for analysis tasks. Third, the performance of the analysis tasks can be good. This means that it can be possible to optimize the code including the custom logic expressed in UDFs even if treating the UDF code itself as black box. Considering the size of the data, the optimizations can consider a scale out by parallelizing code and exploiting parallelization even across multiple nodes in the database.

Today, large scale data analysis is mainly approached from two directions. On the one side, SQL is used in data warehouse applications for the repeated analysis of well-structured data. In this domain, developers benefit from the high-level declarative query language, which is easy to optimize and makes them more productive. However, ad-hoc modes for analysis using complex algorithms are limited by the expressiveness of SQL queries. On the other side, map-reduce offers freedom to implement specialized algorithms. This can come at the cost of manual implementation, testing and tuning. Also, the effectiveness of map-reduce has been questioned, e.g. because the basic map-reduce framework does not consider schema information and because intermediate results are stored on disk. As a middle ground, data-oriented workflow engines seem to evolve.

The workflow-oriented approach can be helpful because it can bring the power of parallelizable data-oriented workflows to database technology. The example implementations can contribute the following:

Introduction of a set of UDF annotations describing UDF behavior.

Demonstration of how parallel UDF execution can be combined with relational database operations.

Description of plan rewrites and a rewrite strategy to transform an initial sequential plan to a parallelized one.

Description of how optimization for parallel execution can also be combined with iterative loops.

In the following section, the preprocessing of an application that predicts the relevant tests for code changes in a large development project based on past test failures. is introduced The example is used later to demonstrate the effectiveness of an optimization and execution strategy. After that the description surveys other work. Another section introduces the UDF annotations upon which the plan optimizations are based. Another section presents a translation process from workflow definition to basic execution plan. Another section presents the rewrites and the rewrite strategy and another section discusses the effectiveness of a strategy based on the example application.

Example 27—Example Application

To illustrate the benefit of an integrated optimization and execution of relational operators and user-defined functions, a use case in the form of an application was analyzed. In the test environment, there were exceedingly long turn-around times for testing after changes were pushed to the Git repository via Gerrit. It was desired to only execute the tests that are affected by a code change, starting with the most relevant ones.

To tackle the problem a classification model was trained based on the history of test executions stored in the test database. The classification model assigns each regression test a probability of failure given the changed files identified by their file-ID. This allows one to define an ordering of the regression tests starting with the regression test with the highest probability of failure and also to exclude tests from the regression test run.

Figure 12:
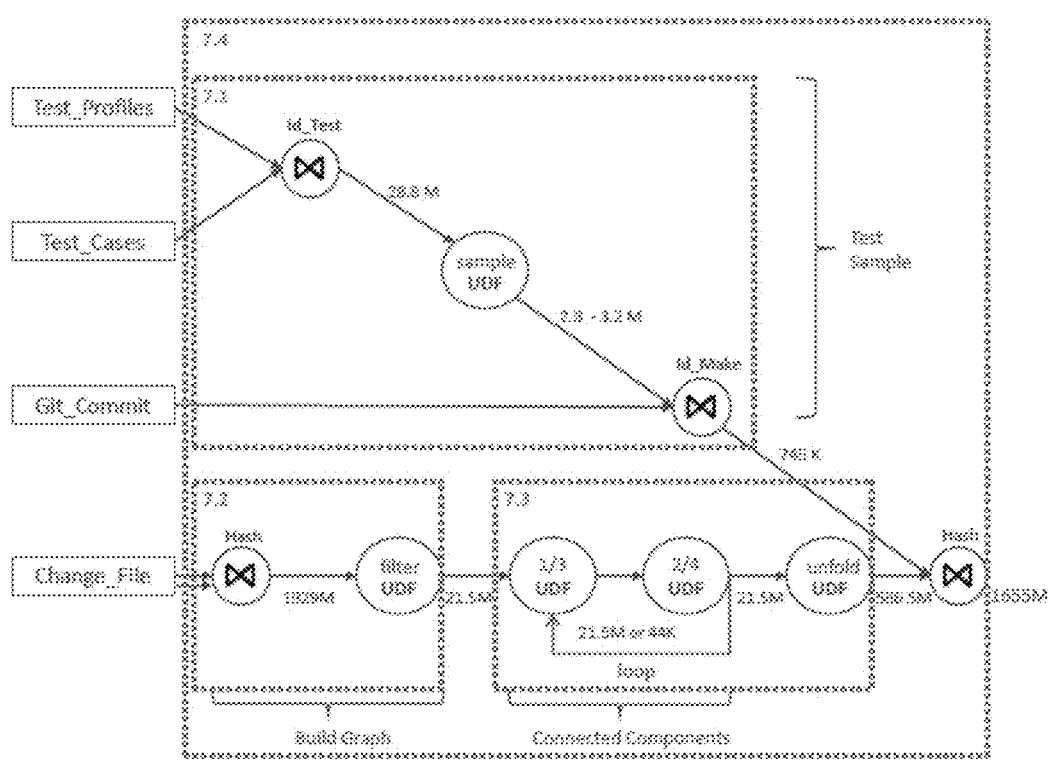
FIG. 12 is a block diagram of example data processing with user-defined functions and JOINs.

FIG. 12 shows a simplified version of the data preprocessing done for the classifier training, and the schema of the test database is shown in Table 1. The model combines relational processing and user-defined functions in a single DAG-structured query execution plan. Such plans can be found in scientific workflows and large-scale data analysis. But as discussed, current systems typically either shine in processing relational operators or UDFs, but rarely in both. The process of creating the training data is illustrated in FIG. 12 and can roughly be separated into two parts.

TABLE 1

Tables of Example Use Case

| Table | Description | Cardinality |
|---|---|---|
| Test_Profiles | the test configurations, primary key Id_Test, Id_Make for the test execution | 4.8M |
| Test_Cases | actual regression tests, primary key ID, foreign key Id_TEST references Test_Profiles, test result in Status | 28.8M |
| Git_Commit | one submitted change, primary key Hash, the submission time Commit_Date, make id Id_Make | 256K |
| Changed_File | the modified source files Id_File and the corresponding Git hash Hash | 2M |

The first part collects information on the test case behavior joining the tables Test_Profiles and Test_Cases and the first UDF function sample. The sample UDF creates a sample of the regression tests at different rates depending on the outcome of the test. Because successful test executions are much more common than failures, one can handle the data skew on the outcome of tests by down-sampling successful test cases and keeping all failing tests.

The second part of the process is more complex. Instead of looking at the impact of a single source file modification from the table Changed_File for the classifier, one can group files that are commonly changed together. It may be that a strong relationship between these groups of files and sets of relevant tests exists. For example, file groups may relate to a common system component in the source code. To identify those file groups one can look for files that were often modified together in one Git commit. The second part of the process therefore starts with the self join of the base table Changed_File followed by the filter UDF. The UDF groups the join result by pairs of Id_File of common Git commits and aggregates the Hash values of the commits into a list of Hashes. After that, pairs of files are discarded that are below a given threshold of co-occurrence in a commit. It may seem that these two operations could be performed by regular relational operators, but the text-based "'folding'" of strings into a CLOB (or set-valued attribute) is not defined in the SQL standard. Inspired by the built-in aggregation function GROUP_CONCAT provided by MySQL, one can implement this grouping with a user-defined aggregate. The final UDF unfold in this part of the process unfolds the CLOB column again for further processing. After the second UDF, one has identified common file pairs. But to identify all groups of connected files, further UDFs are required. One can implement the computation of the connected components with an iterative algorithm using two UDFs: UDF1 and UDF2 with a data-driven break condition.

The details of involved UDFs are discussed below. For now one can note that the input of each UDF can be partitioned and the UDFs can therefore be executed in parallel—similar to relational operators. One can extend optimizers to exploit these opportunities for better performance. Unfortunately, it is difficult to analyze the UDF code and detect if it can and should be parallelized. To solve this problem, one can use the annotations described herein to declare opportunities for parallelization but also to annotate how the output cardinality of the UDF relates to its input.

Example 28—Example Techniques

User-Defined Functions in Relational Databases.

If complex algorithms are implemented inside a relational database, one usually needs to rely on user-defined functions (UDFs) to implement non-standard operations like data cleansing, specific sampling algorithms or machine-learning algorithms. This leads to the desire to efficiently support UDFs inside a database, i.e., considering UDFs during query optimization as well as efficient parallel execution. The placement of expensive predicates and scalar UDFs within an execution plan has been examined. Related work has been surveyed and proved that ordering predicates and map operators (i.e. functions) is an NP-hard problem and provided an optimal algorithm for that optimization problem.

The optimization and parallel execution of user-defined aggregate and table functions has been focused upon. While deterministic scalar UDFs are trivial to parallelize, user-defined aggregation functions are aggregated locally and later combined or reduced to the final result of the aggregate. Some techniques require a static partition strategy be defined for a user-defined table function so that the database can parallelize it. Opportunities for parallelization of user-defined table functions have been identified, which are derived dynamically from the context during query optimization.

One can address all classes of UDFs; the distinction between scalar, aggregate, and table UDFs can be derived from its annotation. For example, UDFs whose input can be partitioned arbitrarily are treated as scalar UDFs if they only attach additional data to a row. One can implement the parallelization of UDFs using the Worker Farm pattern. This allows one to combine worker farm patterns and to exploit opportunities to parallelize the execution of the UDFs.

By default, most commercial databases do not allow for parallelization of user-defined table functions. In some databases, user-defined table functions can be annotated so that their input can be partitioned, and they can be executed in parallel. However, optimization strategy details are unavailable. Overall, the ability to parallelize user-defined table functions in relational databases is very limited today, which also limits the scalability of custom code. Some database vendors offer an interface to standard map-reduce frameworks to benefit from the parallel execution capabilities of map-reduce, but those interfaces do not allow for optimizations across relational and custom logic.

Workflow Engines

The performance deficiencies of map-reduce have been analyzed compared to parallel databases for some basic analysis tasks. These limitations led to the development of workflow engines targeted at large scale data analytics. These engines allow for more flexible compositions of user-defined code than map-reduce while keeping the ability to parallelize tasks. The work of SCOPE by Chaiken, Zhou, et al. describes parallelization. The technologies herein can support both relational operators and UDFs. In PACT by Alexandrov et al., contracts are bound to tasks as pre- and post-conditions. Contracts can enable rewrites of the workflow. The Worker Farm skeleton described herein can have split( ) and merge( ) methods and can focus on the integrated optimization of existing database operators and UDFs.

Rewrites applied on workflows depend on the availability of cardinality information. A repository of statistics for workflows can be maintained, and re-occurring plan patterns can be detected and used for cardinality information. As described herein, annotations on the UDF can be used to derive cardinality information.

Advanced Analytics Applications.

Among the most prominent applications of map-reduce are machine learning algorithms because they are not supported well in databases today but also because they are performance-critical. Apache Mahout is a collection of basic machine learning algorithms implemented on Apache Hadoop, the map-reduce implementation of the Apache project. As many scientific optimization problems, machine learning algorithms and data preprocessing tasks rely on iteration. HaLoop proposed to integrate iteration natively into the map-reduce framework rather than managing iterations on the application level. This includes the integration of certain optimizations into Hadoop, e.g. caching loop invariants instead of producing them multiple times. In the technologies described herein, iteration handling can be explicitly applied during the optimization phase, rather than implicitly hidden in the execution model (by caching).

Another important application area that is not well-supported by databases today is advanced statistical applications. While basic aggregates like average, variance, or standard deviation are usually provided by databases, more advanced statistical functions are not supported well. Many algorithms are available in statistical packages like R or SPSS. Furthermore, domain experts feel more comfortable implementing their algorithms using R. Finally, the basic data for these statistics are stored in relational databases. Consequently, it is desirable to support statistical algorithms implemented, e.g. in the R language, as a special kind of UDFs. The integration of external statistical packages has been mainly treated as a black box, and consequently, the execution of these workflows has missed the potential for better performance. The technologies described herein can remedy the situation.

UDF Annotations

SQLScript procedures are a dialect for stored procedures in SAP HANA to define dataflows and also to include custom coding to be executed in SAP HANA. Several implementation languages are supported including R (RLANG). For the technologies described herein, one can abstract from the implementation language and use pseudo C (PSEUDOC) instead. In the following section is described a number of annotations for SQLScript procedures to provide metadata that help the query optimizer to derive better query execution plans, in particular to increase the degree of parallelism for dataflows with UDFs. These optimizations are available independent from the implementation language chosen. The annotations help to distinguish between scalar, aggregate, and table UDFs based on their partitioning and grouping requirements. The classical Map and Reduce operations are only two possible instances one can describe with the given set of annotations.

Table 2 gives a short overview of all possible annotations. The annotations can be classified into three groups. The first part describes the partitioning pre-conditions expected by the UDF, the second group contains the post-conditions ensured by the UDF, and the third group contains optimizer hints. The keywords BEGIN and END enclose the UDF code, and BEGIN PARALLEL and END PARALLEL mark the beginning and end of the annotations. Those annotations are purely optional, although without partitioning information, the UDF will only be invoked once, and thus no data-level parallelism will be exploited. FIG. 13 shows an example Script 1 that has been annotated according to the technologies herein. The example in Script 1 for the sample UDF ("sample") described above in FIG. 12 shows a complete set of possible annotations, even those that can be implied by others. Since UDFs support multiple inputs and outputs, annotations may apply only to specific input or output tables. This is realized by stating the name of the parameter and enclosing the properties in parentheses.

TABLE 2

Overview of the Annotations

| Class | Annotation | Description |
| --- | --- | --- |
| PARTITION (Pre-conditions) | | Expected global partition properties: a set of input tables each attached to a MINPART and a MAXPART annotation. |
| | MINPART | Required logical partitioning: NONE (Default) as no partitioning required; ANY as expected logical partitioning down to single tuples; A set of column names $<C_1, \ldots, C_n>$ required as GROUP BY partitioning. |
| | MAXPART | Highest possible supported logical partitioning: NONE as no partitioning supported. Pass table as copy; ANY (Default) as support of arbitrary partitioning e.g. round robin); A set of column names $<C_1, \ldots, C_n>$ supported as GROUP BY partitioning. |
| EXPECTED (Pre-conditions) | | Expected partition local properties: A set of input tables each attached to a list of actions $\{\hat{A}_1, \hat{A}_2, \ldots, \hat{A}_n\}$; Â is either a SORTING or a GROUPING annotation |
| | GROUPING | NONE (Default) as no partition local grouping required A set of grouping columns $\{G_1, G_2, \ldots, G_n\}^g$ |

TABLE 2-continued

Overview of the Annotations

| Class | Annotation | Description |
|---|---|---|
| | SORTING | NONE (Default) as no partition local sorting required |
| | | A list of sorting columns $\{S_1^o, S_2^o, \ldots, S_n^o\}$ each given with an order $o \in \{ASC, DESC\}$. |
| ENSURE (Post-conditions) | | Ensured partition local properties after UDF: A set of output relations each attached to a list of actions $\{\hat{A}_1, \hat{A}_2, \ldots, \hat{A}_n\}$; $\hat{A}$ is either a SORTING or a GROUPING annotation |
| | GROUPING | NONE as no partition local grouping guaranteed by UDF A set of grouping columns $\{G_1, G_2, \ldots, G_n\}^g$ |
| | SORTING | NONE as no partition local sorting guaranteed by UDF A list of sorting columns $\{S_1^o, S_2^o, \ldots, S_n^o\}$ each given with an order $o \in \{ASC, DESC\}$. |
| | KEY | UDF behavior regarding grouping columns<br>= (Default) the grouping columns do only contain values which have been input as part of the local partition<br>!= the grouping columns may contain values which have not been input as part of the local partition (existing partitioning cannot be reused)<br>-> describes functional dependencies for new columns derived from previous grouping columns |
| PRESERVE (Post-conditions) | ORDER (Default) | As alternative to ENSURE SORTING or GROUPING this annotation denotes FIFO logic preserving existing SORTING or GROUPING of the input table |
| - (Optimizer Hints) | DETERM | 1 (Default): UDF has deterministic behavior.<br>0: UDF has no deterministic behavior. |
| - (Optimizer Hints) | SIZE | = (Default): expected size of the output relation is equal to the size of the input relation factor: expected size of the output relation can be derived by the size of the input relation multiplied by a factor |
| - (Optimizer Hints) | RUNTIME-APPROX | = (Default): expected run time of the UDF is determined by the size of the input relation factor: expected run time of the UDF is determined by the size of the input relation and a factor |
| END PARALLEL (Post-conditions) | UNION ALL (Default) | By default it assumes an order-preserving concat merge combining the partitions |
| END PARALLEL (Post-conditions) | AGG | Instead of an order-preserving concat merge the UDF can also be followed by any kind of aggregation function known to the database system. In this case an additional repartitioning between UDF and aggregation may be required. |

Partitioning Pre-Conditions

The first annotation PARTITION precedes the code block of the procedure. One can describe the granularity of partitioning supported by the UDF by defining MINPART and MAXPART for each input set. MINPART defines the lower bound of required partitioning, whereas MAXPART defines the upper bound of the highest possible partitioning. One can distinguish between those two so that the optimizer can choose the granularity depending on the surrounding operators and their required partitioning. By default MINPART is set to NONE, which means that the UDF does not need partitioning, whereas the default for MAXPART is ANY, which means that the UDF can handle any partitioning. This default setting—like in Script 1—refers to a UDF table function implementing a scalar operation, which can be executed on each tuple of the relation independently. Since the UDF table function code can cope with multiple tuples at a time and could even consume the whole non-partitioned table, the optimizer can decide freely how to partition the input to the UDF and how to parallelize it.

Many UDFs (such as user-defined aggregates) operate on groups of tuples. A partitioning schema can be described by defining grouping columns for MINPART and MAXPART: The MINPART annotation over a set of columns with n distinct values enforces at least n distinct UDF instances for processing, but it does not ensure that the data is not further partitioned. The MAXPART annotation over a set of grouping columns with n distinct values ensures that the input relation is not partitioned into more than those n distinct parts. It effectively describes a group-by partitioning, but it does not guarantee that a UDF instance consumes only one distinct group. The annotation of MAXPART with the keyword NONE tells the optimizer that the UDF code does not allow partitioning and will only work if the UDF consumes the whole table in a non-partitioned way. Setting MINPART and MAXPART to the same set of columns ensures that each distinct instance of the grouping columns is associated to exactly one distinct UDF instance, which would be equivalent to a reduce function in map-reduce. However, setting MINPART to NONE or a subset of MAXPART can help the optimizer to make better decisions by picking the optimal degree of partitioning. Additionally to the global partitioning, the annotation EXPECTED( ) followed by a list of SORTING and GROUPING actions and their respective columns describes local grouping and sorting of tuples within each partitioned table part. In the example of Script 1 the information is redundant with the annotation MAXPART(ANY) and could be removed.

UDF Behavior and Post-Conditions

Because one can treat user-defined code as a black box, the behavior and possible side effects of the code are—in contrast to the well-defined relational operations—not known to the database management system. Without further information, it is difficult for the optimizer to distinguish between user-defined aggregations, user-defined table functions or some other user-defined logic. It also cannot exploit any characteristics of the UDF that may allow optimizations to be applied to the dataflow. Hence, one can allow for adding a set of post-conditions after the code block of the UDF. The annotation KEY makes a statement about the behavior of the UDF regarding columns used as partitioning columns in the MAXPART annotation. To support a wide range of possible UDFs, those columns are not hidden from the UDF and can be manipulated during processing just like every other column. In order to combine UDF parallelism with relational operators, it is often assumed that those grouping columns are not modified by the UDF. This behavior is annotated as KEY(=). Although the UDF may introduce new tuples or remove existing tuples, the annotation KEY(=) states that the grouping columns contain no new values compared to the input table visible for each respective UDF instance. In contrast, KEY(!=) annotates a modification of grouping columns, which effectively means that existing partitioning on those columns cannot be reused for further processing, since the values and thereby possibly the semantic have been changed. In a similar way, KEY(–>) describes functional dependencies for new columns derived from previous grouping columns and indicates that an existing grouping is reusable even though original grouping columns are missing in the output schema.

If the UDF itself ensures sorting or grouping independent of the given input, it can be annotated by the keyword ENSURE followed by a list of SORTING and GROUPING actions and their respective columns, similar to the EXPECTED annotation from the pre-conditions. Alternatively the annotation PRESERVE ORDER—as in Script 1—states that the UDF implements a first-in-first-out logic preserving the order of tuples derived from the input. Analog to BEGIN PARALLEL PARTITION annotation describing the expected partitioning the END PARALLEL annotation describes the combining of the parallel processed UDF results. By default one can assume an order-preserving concat merge (UNION ALL) is to be used. Alternatively the UDF may also be followed by any kind of aggregation function known to the database system. In this case an additional repartitioning between UDF and aggregation may be required.

Optimizer Hints

In addition to the pre- and post-conditions describing data manipulation there are a number of annotations that describe runtime characteristics of a UDF. This may provide further hints to the optimizer to derive better execution plans. The DETERM annotation tells the optimizer whether the UDF is deterministic or not. By default one can assume the UDF to behave deterministically. However, in the example (see Script 1), the UDF has non-deterministic behavior due to the random function used for sampling. The RUNTIMEAPPROX annotation tells the optimizer something about the expected runtime for the UDF relative to the input respectively output size. In the example, RUNTIMEAPPROX (1_data) states that the runtime of the UDF is linear to the input size. The SIZE annotation tells the optimizer the expected data size of the output relation compared to the input relation. In the example (see Script 1), one knows for sure that the size will not increase and even expect the size to decrease depending on the column STATUS of the input data.

Further annotations are possible to describe UDF properties, e.g. commutativity, associativity or decomposability of aggregate functions. They enable optimizations beyond those discussed here, e.g. to be able to reorder UDFs.

Processing Workflows

Herein is described how to translate a workflow, which may include both UDFs and relational operators. The properties used during optimization are also described.

Structural Properties

To assist in implementation of the technologies, structural properties can be used for reasoning about partitioning, grouping and sorting in a uniform framework. Partitioning applies to the whole relation; it is a global structural property. Grouping and sorting properties define how the data within each partition is organized and are therefore local structural properties. As such properties (and the derived optimizations) do not only apply in the context of relational operations, but are also important in the context of parallel execution of UDFs, one can adapt such a formal description and apply it along with the UDFs annotations. Thus the formalism is described:

Definition (Structural Properties)

The structural properties of a table R can be represented by partitioning information and an ordered sequence of actions:

$$\{P; \{\hat{A}_1, \hat{A}_2, \ldots, \hat{A}_n\}\}$$

where the first part defines its global structural property, and the second sequence defines its local structural property. Global structural properties imply the partitioning function used. The annotations described herein assume a non-ordered partitioning (e.g. hash partitioning) for a given column set or a non-deterministic partitioning (e.g. round-robin or random partitioning) in the case of an empty column set. Local structural properties are represented by an ordered sequence of actions $\hat{A}_i$. Each action is either grouping on a set of columns $\{C_i, \ldots C_j\}^g$, or sorting on a single column $C^o$.

TABLE 3

Partitioned Relation with Grouping and Sorting

| Partition 1 | Partition 2 | Partition 3 |
|---|---|---|
| {1, 4, 2}, | {4, 1, 5}, | {6, 2, 1}, |
| {1, 4, 5}, | {3, 7, 8}, | {6, 2, 9} |
| {7, 1, 2} | {3, 7, 9} | |

Definition (Non-ordered Partitioning)

A table $\mathcal{R}$ is non-ordered partitioned on a set of columns X, if it satisfies the condition $$\forall r_1, r_2 \in \mathcal{R} : r_1[X] = r_2[X] \Rightarrow P(r_2) = P(r_2)$$

where $r_1, r_2$ denote tuples and P the partitioning function used.

Table 3 shows an instance of a table with three columns $C_1$, $C_2$, $C_3$ and structural properties $\{\{C_1\}^g; \{\{C_1, C_2\}^g, C_3^o\}\}$. These properties mean that the table is partitioned on column $C_1$ and, within each partition, data is first grouped on columns $C_1$, $C_2$, and, within each such group, sorted by column $C_3$. The required structural properties of relational operations and the optimizations combining relational operations are available. The annotations herein describe the required structural properties of the input tables consumed by the UDF as well as the structural properties of the returned output tables. This allows combining the optimization of UDFs and relational operations.

Modeling Workflows in SAP HANA

Although SAP HANA is described herein, the technologies can be applied to other database systems. The most convenient way to express complex dataflows in SAP HANA is using SQLScript. One can use syntax that is similar to SQLScript for the UDFs. Relational expressions in SQLScript can be directly translated into the internal representation of a cost-based optimizer. Nonrelational operations, including UDFs, can be mapped to custom operators, which can be compiled into machine code using a just-in-time compiler. Developers of custom logic need to annotate UDFs with the metadata including the ones described herein.

Query processing of workflows in SAP HANA can be managed by the calculation engine. Nodes represent data processing operations, and edges between these nodes represent the dataflow. Data processing operations can be conventional database operations, e.g. projection, aggregation, union or join, but they can also be custom operators processing a UDF. Intermediate results are commonly represented as in-memory columnar tables, and hence, they carry schema information and other metadata, which can be exploited during optimization.

At the modeling level, the dataflow can be parallelized if operators are not in a producer-consumer relationship. At execution time, operators are scheduled for processing, once all their inputs are computed.

Introducing Parallelism

Starting with the basic translation of the workflow into a canonical execution plan, one can attempt to increase the opportunities to parallelize the execution of the dataflow graph. To make sure that the requested partitioning described through the global structural properties is generated, one can support operators such as Initial Partitioning, Repartitioning, Full Merge, Partial Repartitioning, and Partial Merge. One can support some additional merge-operations including Union All and Union Distinct. Any kind of global aggregation function or custom merge can be used to combine partial aggregates or results of user-defined table functions. For the relational operators one can apply property derivation and matching.

Herein such an approach can also be applied to UDFs. Given a non-partitioned input, the generic model to parallelize UDFs is to apply the Worker-Farm pattern. This pattern first applies an initial partitioning operation so that the UDF can be executed in parallel in the so-called work-method. Finally, a merge operation integrates the results of the parallel computations. Further patterns can be parallelized using the Worker-Farm pattern.

The enforcement of partitioning and a full merge for each UDF operation independently is a very simple approach. It is therefore the goal of the optimizer to break this isolated view and to take surrounding operations and their structural properties into account.

Below is described how one can avoid a full partitioning and another full merge between relational operators or UDFs. As analyzed below, exploiting partitioning properties across these operations improves the robustness and scalability of the workflow execution.

Optimization Strategy

As one treats UDFs as table functions, it is often possible to define the UDF code in a way that it can work both as single instance consuming a non-partitioned table as well as with multiple instances on a partitioned table. To reflect this one can describe the required structural properties of the UDFs with a partitioning P that is in the range of a minimal partitioning column set $P_{min}$ and a maximum partitioning column set $P_{max}: \emptyset \subseteq P_{min} \subseteq P \subseteq P_{max} \subset \top$ where $\emptyset$ indicates that the input table is not partitioned ($\perp$) and is passed as a copy to the UDF. On the other extreme and even more general than a partitioning on all available columns, $\top$ indicates an arbitrary partitioning.

If the UDF consumes multiple input tables (e.g. table A and B) it can assume all input tables to be partitioned in the same way ($P_A = P_B$). An exception is the case where the UDF allows partitioning on one input table ($P_{maxA} \neq \emptyset$) but not for all other input tables ($P_{maxB} = \emptyset$). In this case, the non-partitioned table B is broadcast as copy to each UDF instance derived from the partitioning of the table A.

Rewrites

Based on the canonical parallelization of UDFs and relational operators described in herein and the properties derived for them, one can describe the basic plan rewrites in the case of a mismatch of structural properties. Each rewrite considers two consecutive operations $OP_1$ and $OP_2$. Where $\{P_1;*\}$ describes the structural properties of the output of $OP_1$ and $\{P_2;*\}$ the expected structural properties for the input of $OP_2$ and * denotes any local structural property. In case of a mismatch of local structural properties, the framework may further enforce explicit sorting or grouping operations. Table 4 summarizes a possible notation used herein. The most basic exchange operation to fix mismatching global structural properties is a full merge operation followed by a initial partitioning operation.

$$
\begin{aligned}
OP_1 \asymp OP_2 &= OP_1 < OP_2 & &\text{if } P_1 = \emptyset \wedge P_2 \neq \emptyset & &(1)\\
&= OP_1 > OP_2 & &\text{if } P_1 \neq \emptyset \wedge P_2 = \emptyset & &(2)\\
&= OP_1 \times OP_2 & &\text{if } P_1 \neq P_2 & &(3)\\
&= OP_1 - OP_2 & &\text{if } P_1 \subseteq P_2 & &(4)\\
&= OP_1 =< OP_2 & &\text{if } P_1 \subseteq P_2 & &(5)
\end{aligned}
$$

TABLE 4

Notation for Operators and Properties

| Notation | Description |
|---|---|
| OP | Any operation (or sequence of operations)—relational operator or UDF |
| UDF | UDI, operation |
| ROP | Relational operator |
| HJ | Hash join operation |
| BJ | Broadcast join operation |
| < | Initial Partitioning operation |
| > | Full Merge operation |
| × | Repartitioning operation |
| >= | Partial Merge operation |
| =< | Partial Repartitioning operation |
| – | Keep partitioning; it not partitioned—no-op |
| P | Partitioning |
| * | Any properties (including empty) |

The first two rewrites ((1) and (2)) are two special cases where only one of the two involved operations is executed in parallel and has a non-empty partitioning requirement. Consequently, the repartitioning turns into an initial partitioning respectively a full merge operation. The third rewrite (3) is the most general rewrite and can always be applied as it just replaces a full merge and subsequent initial partitioning with a repartitioning, which can be parallelized independent of the concrete partitioning of either operation. The two alternatives ((4) and (5)) however can only be applied, if the result of the first operation $OP_1$ is partitioned on a subset of the partitioning column set required for the input of second operation $OP_2$. Those two rewrites thereby leverage the fact that a result partitioned on column $C_1$ alone is also partitioned on columns $C_1$ and $C_2$ because two rows that agree on $C_1$ and $C_2$ also agree on $C_1$ alone and consequently they are in the same partition ($\{C_1\}^g \Rightarrow \{\{C_1, C_2\}^g\}$). While rewrite (4) keeps the existing partitions from $OP_1$ intact, the alternative rewrite (5) allows to increase the number of partitions—and consequently the degree of parallelization—using the partial repartitioning operation=<. Which of those two rewrites is chosen by the framework is therefore implied by the degree of parallelization defined for each operation and whether the full degree of parallelization is used during each logical operation. The partial repartitioning operation (=<) also introduces another basic rewrite (6), which reverses the partial repartitioning operation by applying a partial merge operation (=>):

$$OP_0 = <OP_1><OP_2 = OP_0 = <OP_1> = 0P_2 \quad (6)$$

if $P_0 \subseteq P_2 \land P_1$ determ.

The partial merge can only be applied together with a previous partial repartition, because a result partitioned on columns $C_1$ and $C_2$ is not partitioned on $C_1$ alone, since two rows with the same value for $C_1$ may be in different partitions ($\{\{C_1,C_2\}^g\} \Rightarrow \{C_1\}^g$). However with a previous partial repartition it take advantage of the fact that for $P_1$ it can for instance apply $\{C_1^g, C_2^g\} \Rightarrow \{\{C_1,C_2\}^g\}$ whereas for $P_2$ it may apply $\{C_1^g, C_2^g\} \Rightarrow \{C_1\}^g$ when reversing the partitioning on $C_2$ during the partial merge operation.

The above rewrites also apply in the context of nested operations such as loops. In this case however, it needs to distinguish between inner rewrites affecting succeeding operations within a nested operation (e.g. loop(<$OP_1$>-<$OP_2$>)=loop($OP_1 \times OP_2 \times$)) and outer rewrites (e.g. $OP_1><$loop($OP^2$)=$OP_1 \times$loop($OP_2$)) affecting the boarders of the nested operation connecting inner operations with outer operations. It can therefore apply first inner rewrites and then follow up with outer rewrites, which does in the case of a loop also take loop invariants into account. If a nested loop operation requires a loop invariant input to be partitioned, this global structural property will be passed to the outside and considered during outer rewrites.

Rewriting Strategy

FIG. 14 shows Algorithm 1, which is used to first traverse the dataflow plan downwards starting from the top nodes to the child nodes to propagate required properties. In the case of nested operations, the optimizer can first step down the embedded-plan before the optimizer continues to with the surrounding plan. For each logical operator, the optimizer considers different alternative physical operators, derives which properties their inputs must satisfy, and requests plans for each input. For example, a hash join operation would request required partitions on the join attributes from its two child expressions.

In the case of a UDF operation, the technologies can use the annotations to derive required and provided properties. The function DetermineChildReqdProperties in Algorithm 1 thereby derives structural properties required by the UDF given the annotations referring to the UDF pre-conditions.

Example

Assume during the first traversal from parent to child one reaches the sample UDF from Test Sample in FIG. 12 with the requirement of its hash join parent that its result be partitioned on {Id_make}. Since the sample UDF has the annotations (minPart(NONE), maxPart(ANY) and KEY(=)) the optimizer considers at least the following three alternatives:

1. Execute the UDF without parallelization by setting partitioning of the UDF to NONE (P={NONE}) and propagate this requirement to its child expression.
2. Execute the UDF with partitioning ANY and request ANY partitioning (P={ANY}) from its child expression.
3. Execute the UDF with partitioning on {Id_make} by setting ANY to the requested partitioning of the parent node (P={Id_make}) and therefore tunnel through this requirement to its child expression.

The algorithm passes all of those requirements while calling the OptimizeExpr function recursively for each child expression. This recursive call is repeated until data source nodes (leaf nodes) are reached returning the data source node as CheapestQueryPlans.

From there on the optimizer can traverse the dataflow plan in the reverse direction from child to parent. For each returned (sub-)query plan the DeriveDlvdProperties function is called to determine the delivered properties. In the case of an UDF operation the function DeriveDlvdProperties derives structural properties delivered by the UDF given the annotations referring to the UDF post-conditions and the properties of the UDF inputs.

Subsequently, the PropertyMatch function compares the delivered properties of the child plan with the required properties of the current operation. In the case of property mismatch, the optimizer introduces exchange operations in order to build a valid plan combining the delivered (sub-)plan with the current operation. As discussed herein, the basic exchange operation regarding global structural properties is a full merge followed by an initial partitioning operation. Based on the rewrites discussed herein, alternative exchange operations can be derived. If multiple different rewrites are applicable for the introduced exchange operation, the optimizer examines the alternatives (e.g., all of them) and selects the best plan based on estimated costs. For each required property, at least one plan alternative is added to valid plans, unless the optimizer prunes the alternative due to cost-based heuristics. It is also a cost-based decision to find the optimal degree of parallelism for each sub-plan. Available partitions for base tables, number of cores and nodes in the distributed landscape, but also communication costs and I/O are factors for these decisions. Furthermore, the optimizer can use the cost and size annotations for UDFs and known cost formulas for relational operators for this decision.

Example

Assume during the reverse traversal from child to parent the technologies reach the sample UDF from Test Sample in FIG. 12 with the delivered property dlvd of its child plan (a hash join) partitioned on {Id_test}. Given the required properties reqd of the sample UDF (P={NONE}, {ANY}, {Id_make}) at least following three plans are considered:
1. Execute the UDF without parallelization and add an basic exchange operation:
$HJ_P=\{Id\_test\}><UDF_P=\{NONE\}$
2. Execute the UDF with partitioning on {Id_test} by setting ANY to the delivered partitioning of the child plan and add an exchange operation.
$HJ_P=\{Id\_test\}><UDF_P=\{Id\_test\}$
3. Execute the UDF with partitioning on {Id_make} and add a basic exchange operation:
$HJ_P=\{Id\_test\}><UDF_P=\{Id\_make\}$ Those basic exchange operations can be rewritten as follows:
1. $HJ_{P=\{Id\_test\}}><UDF_{P=\{NONE\}}$
   (a) Based on rewrite rule (2):
   $HJ_{P=\{Id\_test\}}>UDF_{P=\{NONE\}}$
2. $HJ_{P=\{Id\_test\}}><UDF_{P=\{Id\_test\}}$
   (a) Based on rewrite rule (4):
   $HJ_{P=\{Id\_test\}}-UDF_{P=\{Id\_test\}}$
   (b) Based on rewrite rule (5):
   $HJ_{P=\{Id\_test\}}=<UDF_{P=\{Id\_test\}}$ 3. $HJ_{P=\{Id\_test\}} \bowtie UDF_{P=\{Id\_make\}}$
   (a) Based on rewrite rule (3):
   $HJ_{P=\{Id\_test\}}) \times UDF_{P=\{Id\_make\}}$ The optimizer examines the alternatives (e.g., all of them) and selects the best plan for each property group based on estimated costs. Assuming the optimizer selects following three plans and returns them as CheapestQueryPlans to its consumer:
1. HJP={Id_test}>UDFP={NONE}
2. HJP={Id_test}-UDFP={Id_test}
3. HJP={Id_test}×UDFP={Id_make}

With the consumer being a hash join with required property of (P={Id_make}) the following plans are considered during the next higher level of the recursion:
1. HJP={Id_test}>UDFP={NONE}><HJP={Id_make}
   (a) Based on rewrite rule (1):
   HJP={Id_test}>UDFP={NONE}<HJP={Id_make}
2. HJP={Id_test}-UDFP={Id_test}><HJP={Id_make}
   (a) Based on rewrite rule (3):
   HJP={Id_test}-UDFP={Id_test}×HJP={Id_make}
3. HJP={Id_test}×UDFP={Id_make}><HJP={Id_make}
   (a) Based on rewrite rule (4):
   HJP={Id_test}×UDFP={Id_make}-HJP={Id_make}
   (b) Based on rewrite rule (5):
   HJP={Id_test}×UDFP={Id_make}=<HJP={Id_make}

Since all of those alternatives deliver the same property (P={Id_make}) for the next higher level of the recursion, the optimizer might decide to select only one of those alternative based on estimated costs.

Example 29—Example Evaluation and Additional Information

Herein the impact of the optimization strategy for workflows using both relational operators and UDFs can be described. The example introduced above can be used to show the effect of optimizing a plan for increased parallelization and better scalability. Each plan was executed at least 5 times and in case of strong variation up to 15 times. The numbers presented in this section are the median values of those measurements.

The experiments were conducted using the SAP HANA database on a four node cluster. Every node had two Intel Xeon X5670 CPUs with 2.93 GHz, 148 GB RAM and 12 MB L3 cache. As each CPU is equipped with 6 cores and hyper threading, this resulted in 24 hardware threads per node. The measurements on a single node are labeled 24 local, and the measurements in the distributed landscape are labeled with 4×6 dist. if four nodes with up to 6 parallel operators were used and 4×24 dist. if all resources of all 4 nodes were used. The tests also used a stronger single-node machine labeled 24 LOC because some experiments did not run with 248 GB RAM available. This machine was an Intel Xeon 7560 CPU with 2.27 GHz 24 MB L3 cache per CPU and 256 GB RAM and 16 execution threads per CPU including hyper threading.

Test Sample

The description starts by examining the sub-plan called Test Sample in FIG. 12 of the example use case. Techniques for parallelizing the hash-join in a distributed environment are well-known. For the measurements, the table Test_Cases is partitioned based on Id_Test, and in the distributed case it also stores the partitions for local access. As the join predicates of the two join operations are different, a repartitioning is required if it wants to partition the input for both join operations. Alternatively, a broadcast join can be performed in either case.

Herein the focus is on optimizing the UDF (called sample UDF, see Script 1) which performs a biased sampling of the test cases. Without knowledge about the ability to parallelize this UDF, it has to first merge the input of the UDF, execute the UDF in a single call, and then potentially split its output again for parallel processing. This gives a first baseline for the experiments: HJ>UDF<HJ. Two more baseline plans were analyzed that take parallelization of the UDF into account: with full merge repartitioning (HJ><UDF><HJ) and with parallel repartitioning (HJ×UDF×HJ).

It is a goal to do better than that, and the annotations introduced herein will help to rewrite the plan such that it can be parallelized better, and consequently evaluates faster than the initial alternative. The sample UDF can be processed in parallel because it does not require any specific partitioning (minPart(NONE), maxPart(ANY)). With that knowledge, the optimizer can either align the UDF with the left join (HJ–UDF×HJ) or the right join (HJ×–UDF–HJ). Even without cost estimates available, the SIZE annotation of the UDF indicates that the first alternative is the better choice because sampling leaves only approximately 10% of its input. Avoiding repartitioning by using a broadcast join instead of a hash join implementation introduces three more plan alternatives: 1) HJ–UDF–BJ 2) BJ–UDF–HJ and 3) BJ–UDF–BJ. But since the first join works on very large input tables, the last two options are easily excluded, and thus it need only investigate the alternative HJ–UDF–BJ.

Figure 15:
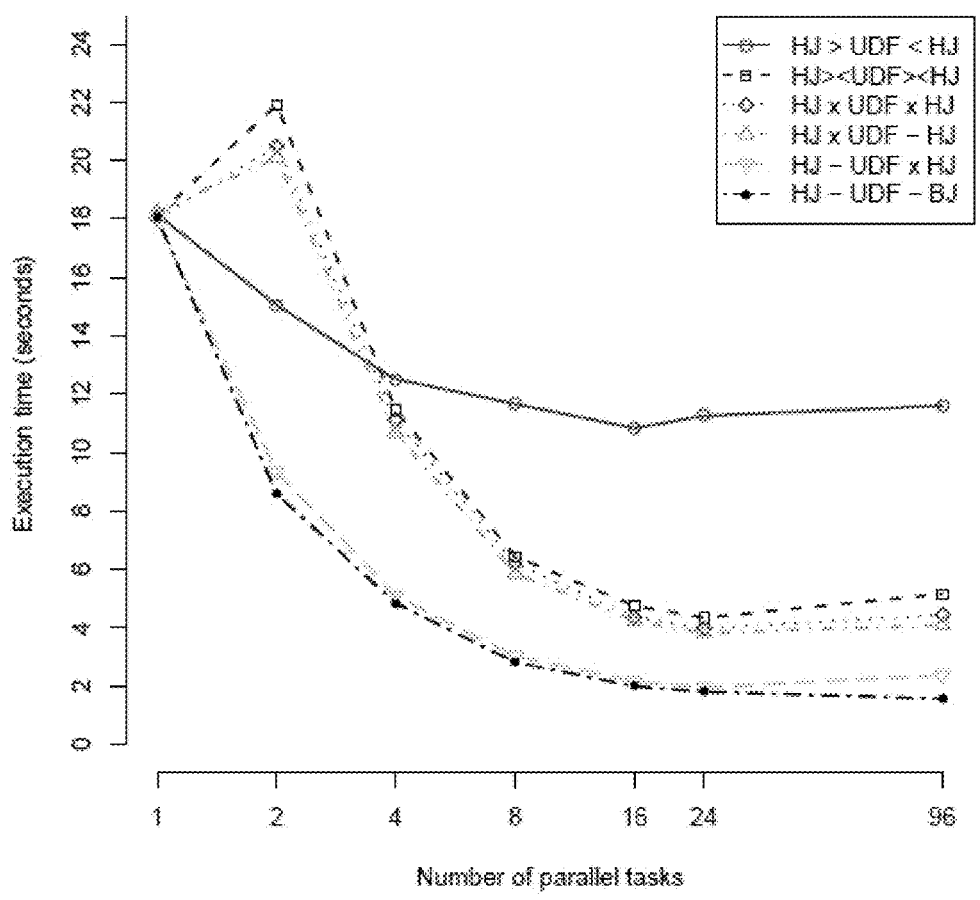
FIG. 15 is graph showing scale out of Test Sample (Join—UDF—Join) with different execution plans (for a single host).
Figure 16:
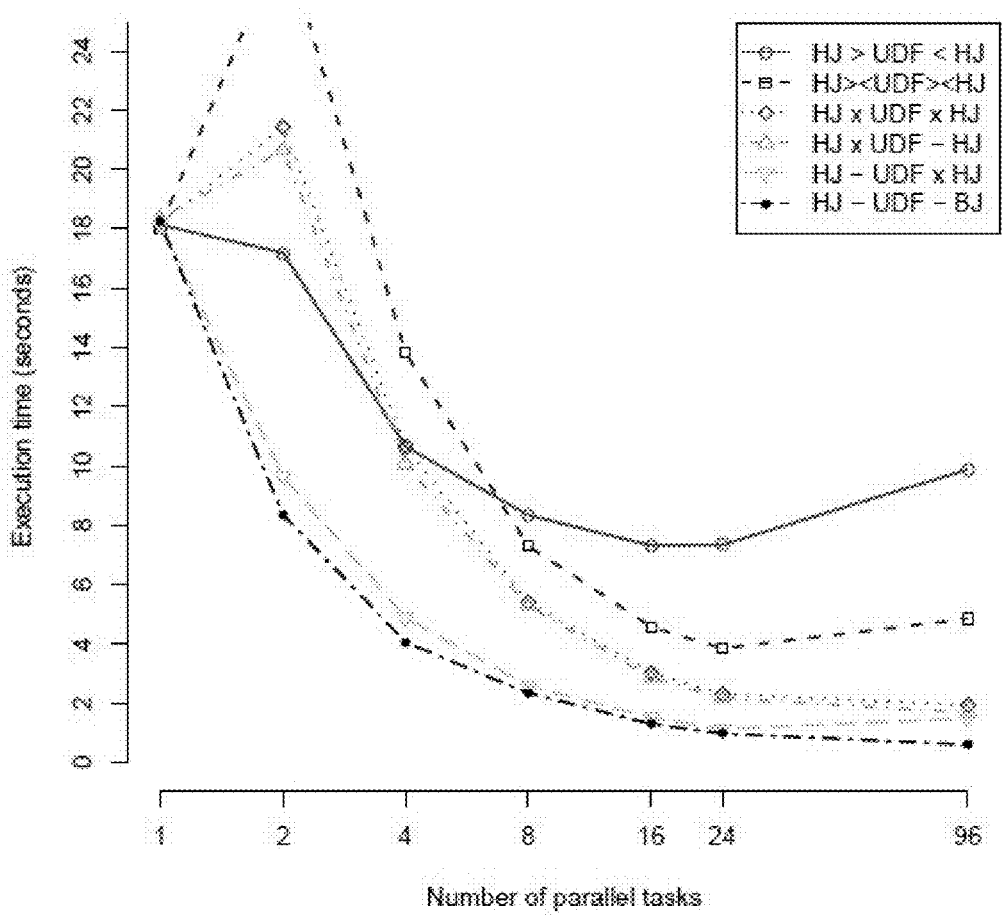
FIG. 16 is graph showing scale out of Test Sample (Join—UDF—Join) with different execution plans (for a four-node cluster).

FIGS. 15-16 plot how the plans scale with an increasing number of parallel operators on the x-axis—either on a single node (FIG. 15) or on up to four nodes (FIG. 16). FIG. 16 uses one node for the case of no parallelism, and two nodes for up to two parallel operators. For the other measurement in this figure all four nodes were used. A figure of local measurements on a bigger machine (LOC) looks similar. For readability, the scale is restricted to 24 seconds. The precise value for HJ><UDF><HJ in FIG. 16 is 27.89 seconds.

In FIGS. 15-16, the baseline plan (HJ>UDF<HJ) with only a single instance of the UDF has the worst scaling behavior. This clearly indicates the benefit of integrating the optimization of relational operators and UDFs. Once one parallelizes processing the UDF with a shuffle (plan alternatives HJ×UDF×HJ and HJ×UDF–HJ) one observes a much better scaling behavior. The performance degradation from 1 to 2 parallel operators is caused by the additional overhead of shuffling while the benefit of parallelizing the UDF is still small. But as one increases the degree of parallelism, performance improves significantly. As expected, one observes an even better performance when one keeps the partitioning for the first join and the sample UDF (plans HJ–UDF×HJ and HJ–UDF–BJ) because this minimizes the communication effort while it enjoys the benefits of parallelization. For up to 24 parallel operators, it does not matter if it shuffles the output of the UDF and uses a hash join or if it performs a broadcast join because it only deals with relatively small data. After that, reshuffling the data for the hash join creates larger overhead than keeping the existing partitioning. The measurements are similar for the setup with single-host and the scale-out indicating that data transmission costs over the network have limited impact for this part of the plan.

Overall, one sees significant benefits by exploiting the annotations for the sample UDF as it allows it to parallelize its execution. Of course, the choice between the plan alternatives must be based on cardinality and cost estimates. Again, the annotations help here.

Build Graph

Next, plan alternatives are analyzed for the sub-plan called Build Graph in FIG. 12. To compute the connected components of related files it can perform a self join on the table Change_File over the column Hash. As a result it gets pairs of files identified by their Id_File that were changed in the same commit, i.e. with the same Hash of the change. After that a filter UDF removes all pairs of files below a threshold of 80% meaning that it only keeps those pairs of files that co-occur in at least 80% of all submissions of both respective files. In addition to that, this UDF folds all Hash values associated with the selected pairs of files into a CLOB. The UDF has the following annotations: minPart (NONE), maxPart(fileID1, fileID2) and EXPECTED GROUPING(fileID1). The annotations imply that no partitioned input is required, that the most fine-grained partitioning is on (fileID1, fileID2) and that the input must be grouped by fileID1 within each partition.

The basic plan alternative to parallelize this plan is to perform a hash join exploiting the partitioning of the base table on column Hash, merge and split again for the UDF, i.e. HJ><UDF. A slightly more advanced alternative is to shuffle the data, i.e. HJxUDF. In both cases the UDF would receive its input partitioned by fileID1 and fileID2. In the experiments only the second alternative is considered because the result of the join is so large that it cannot be processed on a single node. Also, the discussion herein showed that merging and repartitioning scales worse than the shuffle operator. The alternative plan (BJ–UDF) implements the self join using a broadcast join, partitioning one input of the self join over Id_File and broadcasting the second one, avoiding a repartitioning between self join and filter UDF.

TABLE 5

Build Graph

| Env. | Plan Version | Time | σ | Factor |
|---|---|---|---|---|
| 24 LOC | HJ × UDF | 748.66 | 143.90 | — |
| 24 LOC | BJ – UDF | 545.10 | 19.90 | 1.37 |
| 4 × 6 dist. | HJ × UDF | 433.00 | 14.30 | — |
| 4 × 6 dist. | BJ – UDF | 298.6 | 5.20 | 1.45 |
| 4 × 24 dist. | HJ × UDF | 448.86 | 4.50 | — |
| 4 × 24 dist. | BJ – UDF | 272.89 | 3.00 | 1.64 |

Table 5 shows the execution times of both plans for execution on a single node (and more powerful) with up to 24 parallel operators (LOC), in the distributed setup with four nodes and either up to 24 (4×6 dist.) and up to 96 parallel operators (4×24 dist.).

Avoiding the repartitioning of 1929 mio. records results in a speed-up of factor 1.37 for the local plan and 1.45 (resp. 1.64) for the distributed plans. One would expect an even larger improvement with a tuned implementation of the prototype of the broadcast join. Another finding is that—even though the machines are not directly comparable—as it moves from the local plan to the distributed plan, the execution time improves. Moreover, the standard deviation (σ) decreases as one increases parallelism, and thus increasing the parallelism makes the runtime more predictable. Such speed-up can only be achieved because the two partitioning annotations minPart and maxPart yield the flexibility for the optimizer to choose a partitioning over Id_File instead of using a partitioning over fileID1 and file to execute the UDF in parallel. This flexibility is especially valuable because the following UDF1 (respectively UDF3) requires a partitioning on fileID1 (respectively Id_File). While the plan HJxUDF needs to repartition its output again (which takes additional 15 seconds), the alternative (BH–UDF) can directly use the existing partitioning.

Connected Component Loop

Attention is now turned to the sub-plan called Connected Components in FIG. 12. The input for this subplan is an edge relation (fileID1, fileID2) where each edge connects two nodes representing files that were often changed in one commit. The computation of the connected component uses two UDFs—UDF1 and UDF2—inside a loop. The loop iteratively assigns each node a component groupID as min(groupID, fileID1, fileID2) until no new groupID is derived (see FIG. 17 showing Script 2). Since the UDF1 processes the data grouped by fileID1 and the UDF2 processes the data grouped by fileID2, both UDFs can be processed in parallel by partitioning the data accordingly. Consequently, a repartitioning is required between both UDFs.

In the initial implementation (shown in Script 2) UDF1 and UDF2 pass the groupID as part of the edge set, which means that the full edge set with 21.5 mio. records has to be repartitioned during the iteration between each UDF instance. This leads to the two basic plan alternatives:
  loop(<UDF1xUDF2>) and
  loop(UDF1xUDF2x).

The former partitions and merges the edge set before and after each loop iteration, while the latter uses a shuffle operator.

The alternative implementation (shown in FIG. 18 with Script 3) with UDF3 and UDF4 introduces a node set to transfer the group ID information between the UDFs. This has the advantage that instead of having to transfer the full edge set of 21.5 mio. records only the much smaller node set with 44 K records has to be passed between the UDFs. In the case of UDF3 and UDF4 the partitioning and thereby the parallel execution is based on the edge set (maxPart(fileID1) and maxPart(fileID2)), whereas the node set used for transferring the group ID update is broadcast (maxPart(NONE)) to each parallel executed UDF. As the node set is updated in each iteration, a full merge and reparation is required to integrate the updates of each partition. Given this annotation, the optimizer can make sure that the edge set is passed as loop invariant partitioned by fileID1 for the UDF3 and also partitioned by fileID2 for the UDF4. This gives the plan loop(<UDF3><UDF4>).

TABLE 6

Connected Component

| Env. | Plan Version | Time | σ | Factor |
|---|---|---|---|---|
| 24 local | <UDF1 × UDF2> | 2155.88 | 499.7 | — |
| 24 local | UDF1 × UDF2 x | 2654.26 | 604.1 | 0.81 |
| 24 local | <UDF3><UDF4> | 2501.55 | 901.5 | 0.86 |
| 24 LOC | <UDF1 × UDF2> | 652.72 | 33.0 | — |
| 24 LOC | UDF1 × UDF2 x | 262.96 | 11.7 | 2.48 |
| 24 LOC | <UDF3><UDF4> | 181.26 | 12.0 | 3.60 |
| 4 × 6 dist. | <UDF1 × UDF2> | 640.76 | 5.1 | — |
| 4 × 6 dist. | UDF1 × UDF2 x | 200.80 | 4.5 | 3.20 |
| 4 × 6 dist. | <UDF3><UDF4> | 87.80 | 1.5 | 7.30 |
| 4 × 24 dist. | <UDF1 × UDF2> | 645.55 | 30.9 | — |
| 4 × 24 dist. | UDF1 × UDF2 x | 181.27 | 0.8 | 3.50 |
| 4 × 24 dist. | <UDF3><UDF4> | 62.62 | 2.8 | 10.30 |

Table 6 shows the execution time of this iterative process involving nine iterations until convergence is reached. The plans were executed on one local machine with 24 parallel tasks (24 LOC/24 local as described at the beginning of the section), in the distributed setup with 4 nodes with up to 6 parallel operators per node (4×6 dist.) and also with up to 24 parallel operators per node (4×24 dist.).

In the local case (24 local), the machine reached the memory limit when processing the initial edge set including the CLOBs for the Hashes and started swapping the input tables in and out of memory. As a consequence, the execution time of these sub-plans were quite slow, but it also observed a large standard deviation (σ) in the execution time. An analysis of this effect revealed that L3 cache misses were a significant contributor to the longer execution time and also the variance. In contrast to that, the results for the distributed setup show that optimization for the loop execution can speed up the execution considerably. Nevertheless the highest speed-up can still be achieved by providing an efficient UDF implementation, i.e. by moving from UDF1 and UDF2 to the optimized implementation using UDF3 and UDF4. Because of this, it is of particular importance that the language interface and the annotations are flexible enough to support multiple input and output data structures and can describe their behavior under parallelization independent from each other.

Full Execution Plan

The findings for optimizing the execution plan presented above are summarized below. To show the potential of the optimizations presented, one can compare the basic plan alternative with the best alternative found for each sub-plan. For the sub-plan Test Sample it only used one fast alternative (HJ-UDF×HJ) because this part of the plan contributes only a very small fraction to the runtime of the complete workflow. The basic alternative combines the hash join filter UDF (HJ×UDF×) with the unoptimized connected component (<UDF1×UDF2>) involving an additional repartitioning step. The best plan combines a broadcast join filter UDF (BJ–UDF–) with an invariant-sensitive connected component (<UDF3><UDF4>), which can directly reuse the partitioning done for the filter UDF also for the UDF3.

TABLE 7

Full Execution Plan

| Env. | Plan Version | Time | σ | Factor |
|---|---|---|---|---|
| 24 LOC | basic plan | 1793.72 | 168.1 | — |
| 24 LOC | best plan | 907.68 | 73.5 | 2.0 |
| 4 × 6 dist. | basic plan | 1179.25 | 8.1 | — |
| 4 × 6 dist. | best plan | 471.56 | 9.0 | 2.5 |
| 4 × 24 dist. | basic plan | 1196.27 | 20.4 | — |
| 4 × 24 dist. | best plan | 390.49 | 9.1 | 3.1 |

Table 7 shows the execution time for the full plan for the local execution (LOC 24). As the sub-plan Build Graph could not be executed in reasonable time on one of the nodes, it executed the local plan only on the more powerful machine mentioned at the beginning of the section. The distributed execution plans were generated for four nodes with up to 6 operators in parallel per node (4×6 dist.) and also for up to 24 operators in parallel per node with the same hardware as the previous experiments. As a consequence, the measurements on the local nodes and for the distributed environment are not immediately comparable because the nodes in the distributed landscape are less powerful.

The overall execution time is dominated by building the graph and the connected components. The experiments show that by increasing the parallelism (and distribution) in the execution plans one gets lower and more robust execution times. Only by applying the best possible rewrites does one achieve a speed-up of two on a single node. When adding compute power by distributing the plan across four nodes, one achieves even better performance. Also the benefit of an increased degree of parallelism during query execution is pronounced in the distributed case—the performance improvement goes up to a factor of 2.5 or even 3.1 compared to the basic plan alternative. In absolute numbers the slowest plan on the more powerful single node is more than four times slower than the fastest plan in the four node distributed landscape.

Findings

It can be important to combine the optimization of relational operators and user-defined functions because many large-scale data analysis tasks can benefit. To be able to optimize such complex workflows, a number of annotations are described that enable the optimizer to apply rewrites that increase the ability to parallelize plan execution. Annotations can be helpful because in general a query optimizer will not be able to derive the algebraic properties of a user defined function. Based on these annotations a set of rewrites were developed that allow for better parallelization of complex workflows. In the experiments it is shown that the rewrites are beneficial for real-world scenarios. One observes significant speed-up and also lower variance in the query execution times after applying the optimizations.

Example 30—Example Computing Environment

Figure 19:
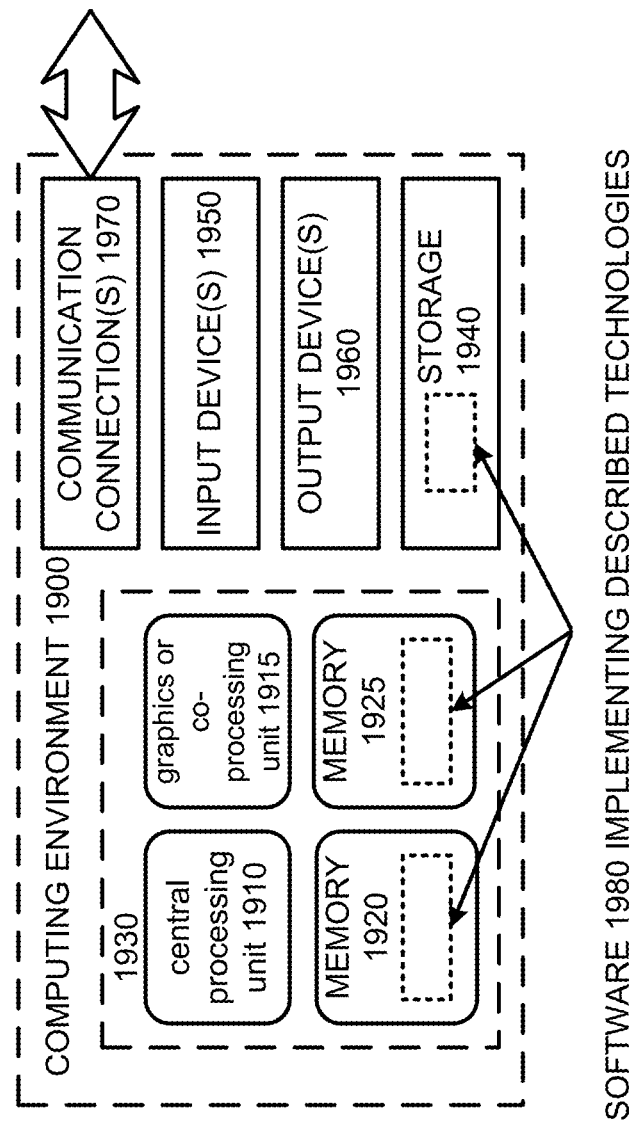
FIG. 19 depicts a generalized example of a suitable computing environment in which the described innovations may be implemented.
Figure 20:
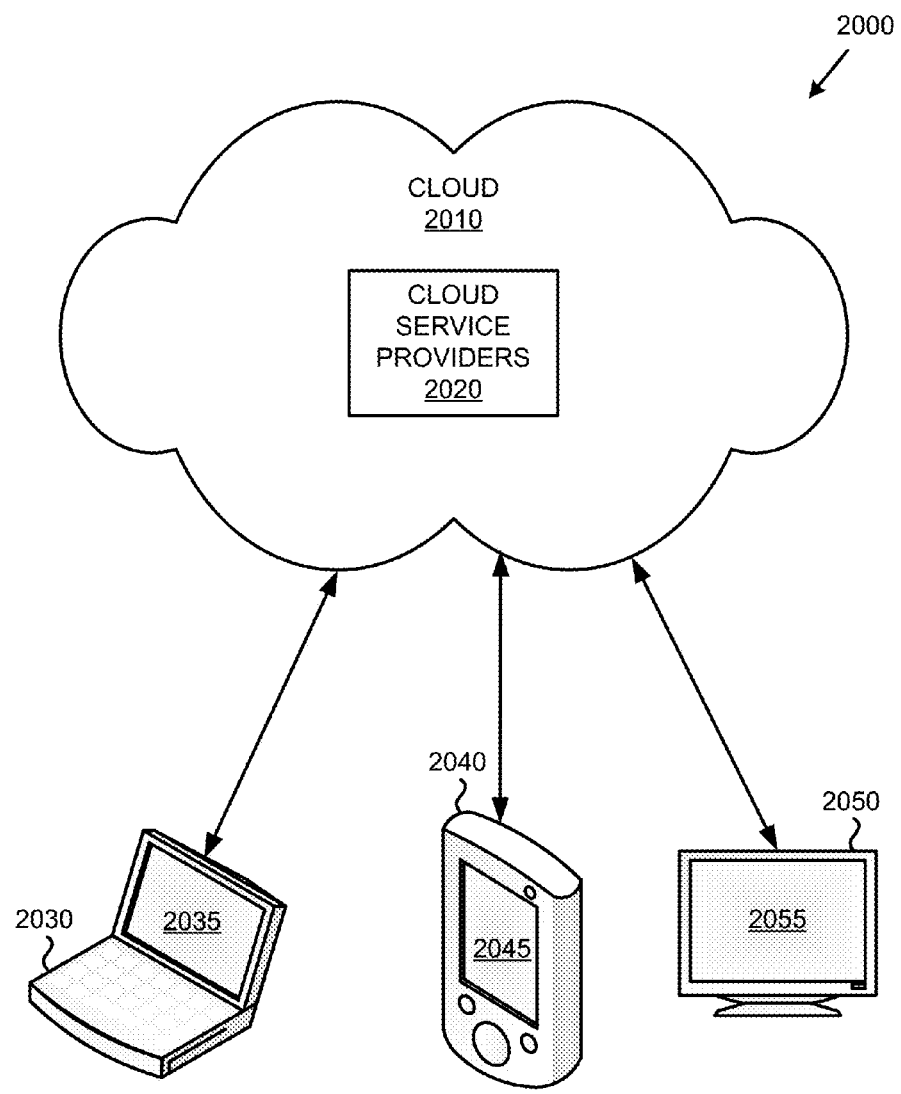
FIG. 20 is an example cloud-support environment that can be used in conjunction with the technologies described herein.

FIG. 19 depicts a generalized example of a suitable computing environment (e.g., computing system) 1900 in which the described innovations may be implemented. The computing environment 1900 is not intended to suggest any limitation as to scope of use or functionality, as the innovations may be implemented in diverse general-purpose or special-purpose computing systems. For example, the computing environment 1900 can be any of a variety of computing devices (e.g., desktop computer, laptop computer, server computer, tablet computer, etc.).

With reference to FIG. 19, the computing environment 1900 includes one or more processing units 1910, 1915 and memory 1920, 1925. In FIG. 19, this basic configuration 1930 is included within a dashed line. The processing units 1910, 1915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 may be volatile memory (e.g., registers, cache, RAM), non-volatile memory (e.g., ROM, EEPROM, flash memory, etc.), or some combination of the two, accessible by the processing unit(s). The memory 1920, 1925 stores software 1980 implementing one or more innovations described herein, in the form of computer-executable instructions suitable for execution by the processing unit(s).

A computing system may have additional features. For example, the computing environment 1900 includes storage 1940, one or more input devices 1950, one or more output devices 1960, and one or more communication connections 1970. An interconnection mechanism (not shown) such as a bus, controller, or network interconnects the components of the computing environment 1900. Typically, operating system software (not shown) provides an operating environment for other software executing in the computing environment 1900, and coordinates activities of the components of the computing environment 1900.

The tangible storage 1940 may be removable or non-removable, and includes magnetic disks, magnetic tapes or cassettes, CD-ROMs, DVDs, or any other medium which can be used to store information in a non-transitory way and which can be accessed within the computing environment 1900. The storage 1940 stores instructions for the software 1980 implementing one or more innovations described herein. For example, the rules engine and others described herein can be the software 1980 executed from the memory 1920.

The input device(s) 1950 may be a touch input device such as a keyboard, mouse, pen, or trackball, a voice input device, a scanning device, or another device that provides input to the computing environment 1900. The output device(s) 1960 may be a display, printer, speaker, CD-writer, or another device that provides output from the computing environment 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Example 31—Example Cloud-Supported Environment

In example environment 2000, the cloud 2010 provides services for connected devices 2030, 2040, 2050 with a variety of screen capabilities. Connected device 2030 represents a device with a computer screen 2035 (e.g., a mid-size screen). For example, connected device 2030 could be a personal computer such as desktop computer, laptop, notebook, netbook, or the like. Connected device 2040 represents a device with a mobile device screen 2045 (e.g., a small size screen). For example, connected device 2040 could be a mobile phone, smart phone, personal digital assistant, tablet computer, and the like. Connected device 2050 represents a device with a large screen 2055. For example, connected device 2050 could be a television screen (e.g., a smart television) or another device connected to a television (e.g., a set-top box or gaming console) or the like. One or more of the connected devices 2030, 2040, 2050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2000. For example, the cloud 2010 can provide services for one or more computers (e.g., server computers) without displays.

Services can be provided by the cloud 2010 through cloud service providers 2020, or through other providers of online services (not depicted). For example, cloud services can be customized to the screen size, display capability, and/or touch screen capability of a particular connected device (e.g., connected devices 2030, 2040, 2050).

In example environment 2000, the cloud 2010 provides the technologies and solutions described herein to the various connected devices 2030, 2040, 2050 using, at least in part, the service providers 2020. For example, the service providers 2020 can provide a centralized solution for various cloud-based services. The service providers 2020 can manage service subscriptions for users and/or devices (e.g., for the connected devices 2030, 2040, 2050 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:
   receiving one or more source code annotations for a user-defined function appearing in source code, wherein the source code defines an executable program comprising both one or more relational operations and one or more user-defined functions, and wherein a source code annotation of the one or more source code annotations specifies at least one property for parallelized instances of the user-defined function, the at least one property comprising a partitioning pre-condition specifying a range of a plurality of permitted partition arrangements for input tables of the parallelized instances of the user-defined function, wherein the range of the plurality of permitted partition arrangements is specified as:
      an upper bound specified in an annotation of the one or more source code annotations and selected as at least one selected from the group consisting of (i) a designation that partitioning is not supported; (ii) a designation that any degree of partitioning is supported; and (iii) identifiers for one or more columns which may be included in partition calculation; and
      a lower bound specified in the annotation of the one or more source code annotations and selected as at least one selected from the group consisting of (i) a designation that partitioning is not required; (ii) a designation that any degree of partitioning is supported; and (iii) identifiers for one or more columns which must be included in partition calculation;
      wherein at least one of the upper bound and the lower bound specifies identifiers for one or more columns and wherein the upper bound and the lower bound are not the same;
   receiving a relational operation out of the relational operations; and
   based at least in part on the relational operation, the source code annotation, and the user-defined function, generating a query execution plan optimized, according to an optimization algorithm, for parallel execution, the generating comprising choosing and avoiding partition or merge operations during query execution plan optimization based on what partition arrangements are permitted for input tables of tables of the parallelized instances of the user-defined function, and wherein, for the optimized query execution plan, a partition arrangement is selected that is within the range of permitted partition arrangements.

2. The method of claim 1 wherein:
   the source code annotation specifies the range in terms of one or more particular table column names; and
   a table column name so specified is interpreted as specifying GROUP BY partitioning.

3. The method of claim 1 wherein:
   the source code annotation explicitly specifies a minimum permitted partition arrangement, wherein the minimum permitted partition arrangement comprises the explicit lower bound of the range; and
   the source code annotation explicitly specifies a maximum permitted partition arrangement, wherein the maximum permitted partition arrangement comprises the explicit upper bound of the range.

4. The method of claim 3 wherein:
the maximum permitted partition arrangement is specified in terms of NONE, ANY, or a set of one or more column names interpreted as specifying GROUP BY partitioning.

5. The method of claim 1 wherein:
the source code annotation specifies an expected grouping or sorting condition for an input table of the user-defined function.

6. The method of claim 1 wherein:
the source code annotation specifies a permitted merge arrangement for combining results of the parallelized instances of the user-defined function.

7. The method of claim 1 wherein:
the source code annotation specifies a post-condition for output of the user-defined function.

8. The method of claim 7 wherein:
the post-condition comprises a grouping or sorting condition for an output table of the parallelized instances of the user-defined function.

9. The method of claim 1 wherein:
the source code annotation specifies an expected size of an output in terms of an input size; or
the source code annotation specifies an expected run time of the parallelized instances of the user-defined function in terms of an input size.

10. The method of claim 1 further comprising:
for a coupling between output of an operation in the executable program and an input of the user-defined function, leveraging partitioning already performed on the output.

11. The method of claim 1 wherein:
the user-defined function comprises a non-deterministic function incorporating statistical sampling.

12. The method of claim 1 further comprising:
implementing the query execution plan, wherein the implementing comprises executing the parallelized instances of the user-defined function.

13. The method of claim 1 wherein:
the input tables are expected by the user-defined function to be within the range of the plurality of permitted partition arrangements.

14. One or more computer-readable storage media comprising computer-executable instructions causing a computing system to perform a method comprising:
receiving one or more source code annotations for a user-defined function appearing in source code, wherein the source code defines an executable program comprising both one or more relational operations and one or more user-defined functions, and wherein a source code annotation of the one or more source code annotations specifies a property for parallelized instances of the user-defined function, the at least one property comprising a pre-condition specifying a range of a plurality of permitted partition arrangements for input tables of the parallelized instances of the user-defined function, at least a portion of the range being specified as:
an upper bound specified in an annotation of the one or more source code annotations and selected as at least one selected from the group consisting of (i) a designation that partitioning is not supported; (ii) a designation that any degree of partitioning is supported; and (iii) identifiers for one or more columns which may be included in partition calculation; and
a lower bound specified in the annotation of the one or more source code annotations and selected as at least one selected from the group consisting of (i) a designation that partitioning is not required; (ii) a designation that any degree of partitioning is supported; and (iii) identifiers for one or more columns which must be included in partition calculation;
wherein at least one of the upper bound and the lower bound specifies identifiers for one or more columns and wherein the upper bound and the lower bound are not the same;
receiving a relational operation out of the relational operations;
based at least in part on the relational operation, the source code annotation, and the user-defined function, generating a query execution plan optimized, according to an optimization algorithm, for parallel execution, the generating comprising:
comparing at least one partition arrangement of a candidate query execution plan with the pre-condition;
determining if the at least one partition arrangement is within the range specified in the pre-condition; and
if the at least one partition arrangement is within the range specified in the pre-condition, selecting the candidate query execution plan as a candidate optimized query execution plan.

15. One or more computer-readable storage media having encoded thereon structured data causing a compiler to generate a query execution plan comprising instances of a relational database operation and a user-defined function, the structured data comprising:
source code comprising the relational database operation;
source code comprising the user-defined function, wherein the user-defined function comprises an annotation constraining the query execution plan and specifying a range of a plurality of permitted partition arrangements for parallelized executing instances of the user-defined function, wherein the range of the plurality of permitted partition arrangements for input tables of the parallelized instances of the user-defined function is specified explicitly and comprises:
an upper bound specified in the annotation and selected as at least one selected from the group consisting of (i) a designation that partitioning is not supported; (ii) a designation that any degree of partitioning is supported; and (iii) identifiers for one or more columns which may be included in partition calculation; and
a lower bound specified in the annotation and selected as at least one selected from the group consisting of (i) a designation that partitioning is not required; (ii) a designation that any degree of partitioning is supported; and (iii) identifiers for one or more columns which must be included in partition calculation;
wherein at least one of the upper bound and the lower bound specifies identifiers for one or more columns and wherein the upper bound and the lower bound are not the same;
instructions for generating a query execution plan for parallel execution based at least in part on the partitioning pre-condition, the generating comprising:
determining if a partitioning arrangement of a candidate query execution plan is within the explicit upper bound and the explicit lower bound; and modifying the partitioning arrangement of the candidate query execution plan to be within the explicit upper bound and the explicit lower bound if the partitioning arrangement of the candidate query execution plan is not within the explicit upper bound and the explicit lower bound.

16. The one or more computer-readable storage media of claim 15, wherein the annotation specifies a minimum permitted partition arrangement and a maximum permitted partition arrangement.

17. The one or more computer-readable storage media of claim 15, wherein the annotation specifies permitted partition arrangements in terms of one or more database columns.

18. The one or more computer-readable storage media of claim 17, wherein the annotation specifies permitted partition arrangements in terms of one or more database columns for which a given permutation of values for the database columns must be present in a same partition when executing the parallelized instances of the user-defined function.

19. One or more computer-readable storage media comprising computer-executable instructions causing a computing system to perform a method comprising:
 receiving source code comprising a relational operation, a user-defined function coupled to the relational operation, and an annotation for the user-defined function indicating, in terms of a column of an input database table to the user-defined function, a range of a plurality of permitted partition arrangements for inputs to parallelized instances of the user-defined function via an explicit upper boundary of permitted partition arrangements and an explicit lower boundary of permitted partition arrangements, wherein the range of the plurality of permitted partition arrangements is specified as:
  the explicit upper boundary specified in the annotation and selected as at least one selected from the group consisting of (i) a designation that partitioning is not supported; (ii) a designation that any degree of partitioning is supported; and (iii) identifiers for one or more columns which may be included in partition calculation; and
  the explicit lower boundary specified in the annotation and selected as at least one selected from the group consisting of (i) a designation that partitioning is not required; (ii) a designation that any degree of partitioning is supported; and (iii) identifiers for one or more columns which must be included in partition calculation;
 wherein at least one of the explicit upper boundary and the explicit lower boundary specifies identifiers for one or more columns and wherein the explicit upper boundary and the explicit lower boundary are not the same; and
 generating an optimized, parallelized query execution plan for the source code based on the annotation, the generating comprising:
  considering a plurality of permitted partition possibilities within the range of the plurality of permitted partition arrangements inclusively between the explicit upper boundary and the explicit lower boundary;
  choosing for the optimized query execution plan a preferred partition possibility out of the plurality of permitted partition possibilities and an optimal degree of parallelism; and
  executing a query according to the query execution plan, the executing comprising partitioning records according the permitted partition possibility of the optimized query execution plan.

\* \* \* \* \*